(12) United States Patent
Delbue et al.

(10) Patent No.: US 11,956,139 B2
(45) Date of Patent: Apr. 9, 2024

(54) METHOD AND APPARATUS FOR SIMULTANEOUS PROTOCOL AND PHYSICAL LAYER TESTING

(71) Applicant: Teledyne LeCroy, Inc., Thousand Oaks, CA (US)

(72) Inventors: Roger Delbue, Monroe, NY (US);
Patrick Connally, Suffern, NY (US);
Hitesh Patel, Pompton Lakes, NJ (US);
Gordon Getty, Santa Clara, CA (US);
Yann Oeffner, Signy (CH)

(73) Assignee: TELEDYNE LECROY, INC., Thousand Oaks, CA (US)

( * ) Notice: Subject to any disclaimer, the term of this patent is extended or adjusted under 35 U.S.C. 154(b) by 169 days.

(21) Appl. No.: 17/458,983

(22) Filed: Aug. 27, 2021

(65) Prior Publication Data

US 2022/0067333 A1 Mar. 3, 2022

Related U.S. Application Data

(60) Provisional application No. 63/072,617, filed on Aug. 31, 2020.

(51) Int. Cl.
*H04L 69/18* (2022.01)
*H04L 43/18* (2022.01)
*H04L 69/00* (2022.01)

(52) U.S. Cl.
CPC .............. *H04L 43/18* (2013.01); *H04L 69/18* (2013.01); *H04L 69/26* (2013.01); *G06F 2218/02* (2023.01); *G06F 2218/10* (2023.01)

(58) Field of Classification Search
CPC ..... H04L 43/18; H04L 43/0823; H04L 43/10; H04L 43/50; H04L 69/18; H04L 69/26; G06F 2218/02; G06F 2218/10; G06K 9/0053
USPC ......... 73/465; 324/72.5, 73.1, 76.19, 750.01, 324/754.07, 755.01; 375/346; 455/296; 702/57, 66–68, 70, 77, 106, 108, 117, 702/121, 127, 183, 189–191; 714/724
See application file for complete search history.

(56) References Cited

U.S. PATENT DOCUMENTS

| | | | | |
|---|---|---|---|---|
| 6,614,781 B1 * | 9/2003 | Elliott | ................. | H04M 7/1245 370/352 |
| 6,631,481 B1 * | 10/2003 | Hoard | .................... | G06F 11/24 714/E11.154 |
| 7,660,685 B2 * | 2/2010 | Pupalaikis | .............. | H04L 43/50 702/66 |

(Continued)

FOREIGN PATENT DOCUMENTS

CN 107068575 A * 8/2017 ......... G06F 17/5072

OTHER PUBLICATIONS

Open Systems Interconnection model (OSI model), Wikipedia, The Free Encyclopedia, accessed from https://en.wikipedia.org/wiki/OSI_model on Jan. 11, 2023.

(Continued)

*Primary Examiner* — Jeffrey P Aiello
(74) *Attorney, Agent, or Firm* — K&L Gates LLP

(57) ABSTRACT

A method, system, and apparatus for simultaneous physical layer and protocol testing is provided that provides for simultaneous test of many layers of the communication stack at the same time, providing further measurement capability and insight into complex phenomena.

38 Claims, 21 Drawing Sheets

(56) References Cited

U.S. PATENT DOCUMENTS

| | | | |
|---|---|---|---|
| 8,126,577 B2* | 2/2012 | Ticknor | G05B 23/0256 |
| | | | 700/83 |
| 8,170,820 B2 | 5/2012 | Pupalaikis et al. | |
| 11,196,412 B1* | 12/2021 | Francis | H03K 17/162 |
| 2004/0239348 A1* | 12/2004 | Barr | G01R 1/06711 |
| | | | 324/754.02 |
| 2008/0018350 A1* | 1/2008 | Chao | G01R 1/07378 |
| | | | 324/754.18 |
| 2008/0255784 A1* | 10/2008 | Gamper | G01R 13/029 |
| | | | 702/67 |
| 2010/0063760 A1* | 3/2010 | Rule | G01R 13/0254 |
| | | | 702/68 |
| 2019/0341373 A1* | 11/2019 | Yu | H01L 21/6835 |
| 2020/0033409 A1* | 1/2020 | Hobbs | G11C 29/56016 |
| 2020/0284822 A1* | 9/2020 | Whittington | G01R 13/20 |

OTHER PUBLICATIONS

ATM-MPLS Network Interworking Version 2.0, af-aic-0178.001, ATM Forum Technical Committee, Aug. 2003, 34 pages.

* cited by examiner

FIG. 18B

METHOD AND APPARATUS FOR SIMULTANEOUS PROTOCOL AND PHYSICAL LAYER TESTING

CROSS-REFERENCE TO RELATED APPLICATION

This application claims the benefit of priority under 35 U.S.C. § 119(e) to U.S. Provisional Patent Application Ser. No. 63/072,617, titled METHOD AND APPARATUS FOR SIMULTANEOUS PROTOCOL AND PHYSICAL LAYER TESTING, filed Aug. 31, 2020, the disclosure of each of which is herein incorporated by reference in its entirety.

FIELD

The present disclosure relates to test and measurement of high-speed serial data links and in particular to physical and protocol testing of these links.

BACKGROUND

Many of today's electronic devices such as computers, servers, storage media, memory, etc. employ high-speed serial links to transfer data, with the rate of speed increase occurring at a breathtaking rate. In order to ensure interoperability, many standards have been created that specify various aspects that must be adhered to. These specifications have been separated conceptually into different categories, typically following the Open Systems Interconnection (OSI) model (see https://en.wikipedia.org/wiki/OSI_model).

FIG. 1 shows one such categorization for the PCI-Express standard. Here a device [1] is shown communicating with another device [6] through a communication channel [5]. The device [1] is shown implementing at least three layers of the OSI model: the transaction layer [2], the data link layer [3], and the physical layer [4].

The reason for the partitioning of specifications for standards, aside from general benefits of abstraction, is that each layer involves separate disciplines, and the testing of different layers generally involves completely different types of test equipment and analysis methods. This becomes apparent in FIG. 2, the device [1] is shown again with its three layers of the OSI model.

The physical layer, as its name implies, is involved in the physical characteristics of received and transmitted signals. The common tools used for physical layer testing include the time-domain reflectometer (TDR) and vector network analyzer (VNA) for measuring channel characteristics, the bit error rate tester (BERT) for directly measuring error rate, and the digital storage oscilloscope (DSO), which is the primary instrument for analyzing the electrical behavior of the transmitter. Physical layer analysis, from the standpoint of the DSO involves sophisticated algorithms for measuring the shape of waveforms along with analysis of eye-patterns, jitter, noise, etc. The DSO is also capable of measuring many other aspects of the electronics, such as power supplies. In FIG. 2, the digital oscilloscope [12] and the digital oscilloscope screen [13] are shown stylistically analyzing the digital oscilloscope traditional test domain [14], which primarily includes the device physical layer [4]. Note that the digital oscilloscope traditional test domain [14] does extend slightly into coverage of the device data link layer [3].

The layers above the device physical layer [4], namely the device transaction layer [2] and the device data link layer [3] shown primarily involve digital signals and protocol, which comprise the protocol analyzer traditional test domain [15].

While the digital oscilloscope [12] is primarily involved with measurements involving the electrical reliability of the communications, the protocol analyzer [10] is primarily involved in testing whether the device is following the proper protocol, meaning, in layman's terms, whether it is speaking the right language.

Engineers involved in protocol measurements are testing, to some extent, the device physical layer [4] as the protocol analysis will not run properly if the device physical layer [4] is not implemented properly, but there is no analysis of the physical layer. Similarly, engineers involved in testing the physical layer are determining the reliability of symbols being interpreted properly, but generally pay no attention to what the symbols actually mean. Recent advances in oscilloscope design have, however, added some features like serial triggers, which allow patterns of symbols to trigger the digital oscilloscope [12], along with decoding capability that enables some crude form of digital analysis, albeit with much, much shorter records and much less capability than the protocol analyzer [10] is capable of.

As the electronic devices being measured are very complicated, there are often times when the engineer is wanting to use the capability of both the digital oscilloscope [12] and the protocol analyzer [10] analyzer simultaneously in a coordinated manner. A very simple example is when a protocol error occurs, one might want to examine the underlying waveform for the source of the error, which might be a physical layer problem. Today, there is no way of doing this.

Both protocol analyzers and modern oscilloscopes are available with deep memory, but even deep memory can be construed in some circumstances as not very deep. As an example, a modern oscilloscope with 4 Gpts of memory (a large amount of memory) sampling at 160 GS/s would fill the memory in only 25 ms! Hardly a long amount of time. For this reason, both scopes and protocol analyzers involve triggers to specify when to stop the data acquisition. Furthermore, many oscilloscopes employ segmented acquisitions which allow for multiple, smaller acquisition records to be acquired from several trigger events. Unfortunately, in today's protocol analyzers there is no way to trigger on things that an oscilloscope can trigger on and vice versa.

Finally, there is no way currently to aggregate both physical layer and protocol layer data for concurrent analysis.

What is needed are instruments capable of examining the waveform associated with a protocol event.

What is further needed is some form of cross triggering capability that allows physical layer phenomena to trigger the protocol analyzer and protocol related phenomena to trigger the oscilloscope.

What is further needed are mechanisms for time aligning the oscilloscope and protocol data that is acquired.

What is further needed are methods and apparatuses for aggregating physical layer and protocol data for joint analysis of these very different types of data.

SUMMARY

The following summary is provided to facilitate an understanding of some of the innovative features unique to the aspects disclosed herein and is not intended to be a full description. A full appreciation of the various aspects can be gained by taking the entire specification, claims, and abstract as a whole.

In one aspect, a computer-implemented method is provided. The method comprises receiving, from a component of a protocol analyzer, first data that specifies content of packets encoded in an electrical signal sent over a communication channel between a first device and a second device and analyzed by the protocol analyzer; receiving, from a component of one or more than one oscilloscope, second data that specifies waveform characteristics of the electrical signal sent over the communication channel between the first device and the second device and probed by the one or more than one oscilloscope; triggering, from a component of the protocol analyzer, an event, wherein the event causes the one or more than one oscilloscope to capture additional electrical signals around time of the event or triggering; or triggering, by a component of the one or more than one oscilloscope, an event, wherein the event causes the protocol analyzer to capture communication events around time of the event or triggering; correlating, from a circuit, the electrical signal measurement with the communication events; and presenting, by a display device, a user interface configured to concurrently present the content of the communication events specified by the first data received from the protocol analyzer, and a graphical depiction of the electrical signal waveform characteristics specified by the second data received from the component of the one or more than one oscilloscope.

In another aspect, an apparatus is provided. The apparatus comprises a circuit configured to: receive, from a component of a protocol analyzer, first data that specifies content of packets encoded in an electrical signal sent over a communication channel between a first device and a second device and analyzed by the protocol analyzer; receive, from a component of one or more than one oscilloscope, second data that specifies waveform characteristics of the electrical signal sent over the communication channel between the first device and the second device and probed by the one or more than one oscilloscope; trigger, from a component of the protocol analyzer, an event, wherein the event causes the one or more than one oscilloscope to capture additional electrical signals or trigger; or trigger, by a component of the one or more than one oscilloscope, an event, wherein the event causes the protocol analyzer to capture communication events around time of the event or trigger; correlate the electrical signal measurement with the communication event; and present, on a display device, a user interface configured to concurrently present the content of the communication events specified by the first data received from the protocol analyzer, and a graphical depiction of the electrical signal waveform characteristics specified by the second data received from the component of the one or more than one oscilloscope.

In yet another aspect, a system for measuring a device is provided. The system comprises a component of a protocol analyzer configured to capture communication events; a component of one or more than one oscilloscope configured to capture an analog signal, wherein the component of the one or more than one oscilloscope is further configured to trigger the component of the protocol analyzer to capture communication events and wherein the component of the protocol analyzer is further configured to trigger the component of the one or more than one oscilloscope to capture an electrical signal; an interposer, connected to the protocol analyzer, configured to probe electrical signals and comprising one or many permanent probe tips or connection for temporary attachment of probe tips, wherein the probe tips probe analog characteristics of high speed signals and are electrically connected to the one or more than one oscilloscope; and a circuit configured to: receive the communication events and the analog signal; de-embed effects of the interposer from the communication events and the analog signal; correlate the electrical signal to the communication events or correlate the communication events to the electrical signal; and control and display a user interface comprising waveform traces in time domain from the one or more than one oscilloscope and captured data from the protocol analyzer, wherein the user interface further comprises a summary of the waveform and the captured data on a common time scale.

In yet another aspect, a method for measuring a device is provided. The method comprises capturing, from a component of a protocol analyzer, communication events; capturing, from a component of one or more than one oscilloscope, an analog signal; probing, by an interposer connected to the protocol analyzer, electrical signals, wherein the interposer comprises one or many permanent probe tips or a connection for temporary attachment of probe tips, wherein the probe tips probe analog characteristics of high speed signals and are electrically connected to the one or more than one oscilloscope; triggering, from a component of the protocol analyzer, the one or more than one oscilloscope to capture an electrical signal or triggering; or triggering, by a component of the one or more than one oscilloscope, an event, wherein the event causes the protocol analyzer to capture communication events around time of the event or triggering; correlating, by a circuit, the electrical signal with the communication event or correlating, by the circuit, the communication events to the electrical signal; and de-embedding, by the circuit, effects of the interposer from the communication events and the analog signal; and controlling and displaying, by the circuit, a user interface comprising waveform traces in time domain from the one or more than one oscilloscope and captured data from the protocol analyzer, wherein the user interface further comprises a summary of the waveform and the captured data on a common time scale.

In various other aspects, in order to provide for simultaneous physical layer and protocol analysis, the present technology comprises first the capability present in one or more than one oscilloscope and protocol analyzer and adds capability in the form of special hardware and software.

The special hardware additions comprise first signal generation and signal reception from and to both the protocol analyzer and one or more than one oscilloscope in the form of triggers and time synchronization. The inventors refer to the ability of each of the devices to trigger each other as cross-triggering capability.

Furthermore, hardware is added to the commonly used device for protocol analysis called an interposer, which is a device that connects between a host and a device under test (DUT) that allows communication signals to be picked off and sent to the protocol analyzer. In this way, the protocol analyzer monitors the communications. Signal monitoring/probing points are added for one or more than one oscilloscope monitoring of physical layer phenomena including the physical shape and characteristics of the communication signals, the clocks, the power supplies and many other signals whose analysis is of interest regarding the relationship between physical layer events and protocol events. The provision of means for probing all of these signals in conjunction with, and time aligned with, the decoded protocol layer data is referred to by the inventors as cross-probing capability.

Software is provided that can reside on a separate computer or in the one or more than one oscilloscope itself which, in addition to controlling the one or more than one oscilloscope and protocol analyzer, aggregate data acquired by both instruments forming a single interface that allows for simultaneous display, analysis, and navigation through this data. An important feature of the software is the ability to navigate seamlessly through the data from either type of device with a common time scale.

Because of the aggregation and seamless integration of the data captured from two very different types of instruments, the system according to the present disclosure enables complicated events that occur in systems to be analyzed with much further insight into the system behavior. This capability is referred to by the inventors as cross-analysis.

The present disclosure accordingly comprises the several steps and the relation of one or more of such steps with respect to each of the others, and the apparatus embodying features of construction, combinations of elements and arrangement of parts that are adapted to affect such steps, all is exemplified in the following detailed disclosure, and the scope of the present disclosure will be indicated in the claims.

In one aspect, the present disclosure provides an instrument, or combination of instruments capable of examining waveforms associated with protocol events and for examining protocol data associated with physical layer events.

In another aspect, the present disclosure provides a cross triggering capability that allows physical layer phenomena to trigger the protocol analyzer and protocol related phenomena to trigger the oscilloscope.

In another aspect, the present disclosure provides mechanisms for time aligning the oscilloscope and protocol data that is acquired.

In another aspect, the present disclosure provides methods and apparatuses for aggregating physical layer and protocol data for joint analysis.

Still other advantages of the present disclosure will in part be obvious and will in part be apparent from the specification and drawings.

BRIEF DESCRIPTION OF THE DRAWINGS

For a more complete understanding of the present disclosure, reference is made to the following description and accompanying drawings, in which:

FIG. 18B is a partial screenshot of the CrossSync application, including the control bar, in accordance with at least one aspect of the present disclosure;

DETAILED DESCRIPTION

Figure 1:
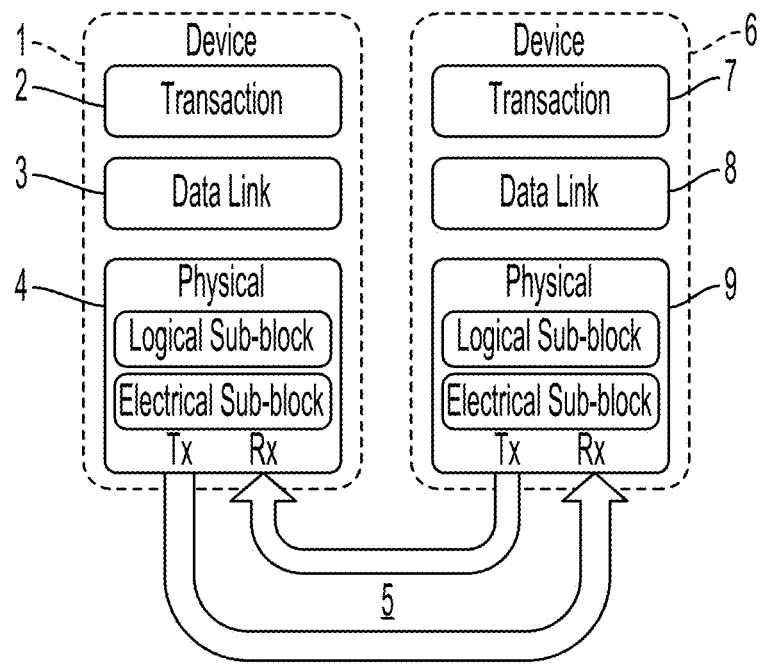
FIG. 1 shows the physical, data link, and transaction layers for device-device communication, in accordance with at least one aspect of the present disclosure.
Figure 2:
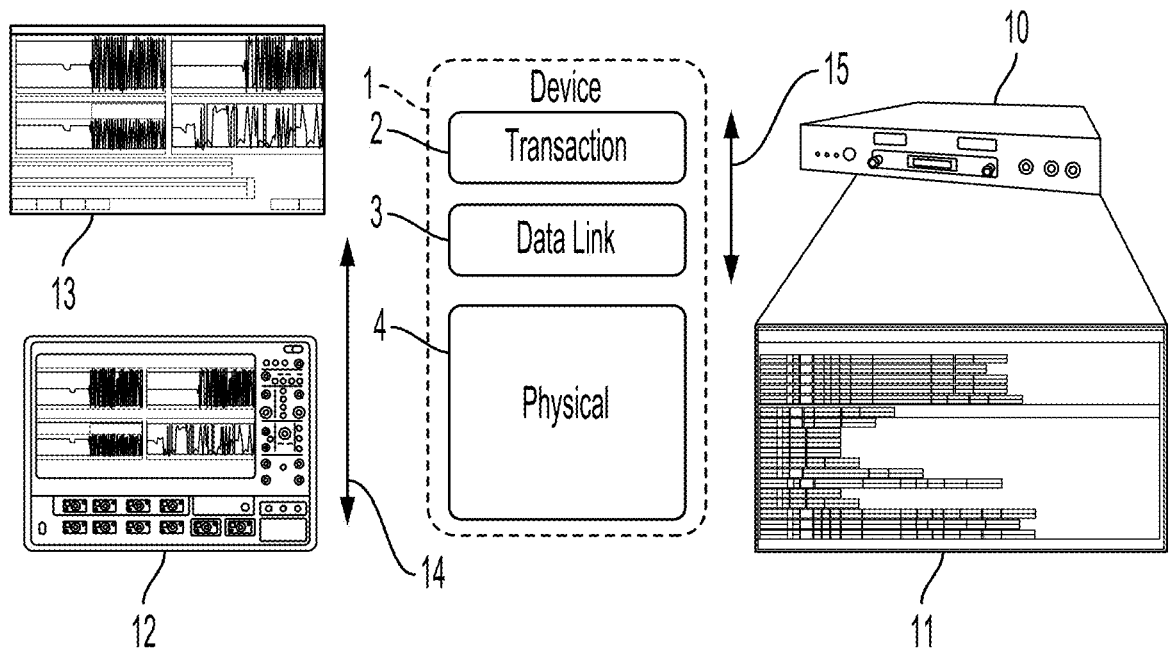
FIG. 2 shows the testing domain for oscilloscopes and protocol analyzers, in accordance with at least one aspect of the present disclosure.
Figure 3:
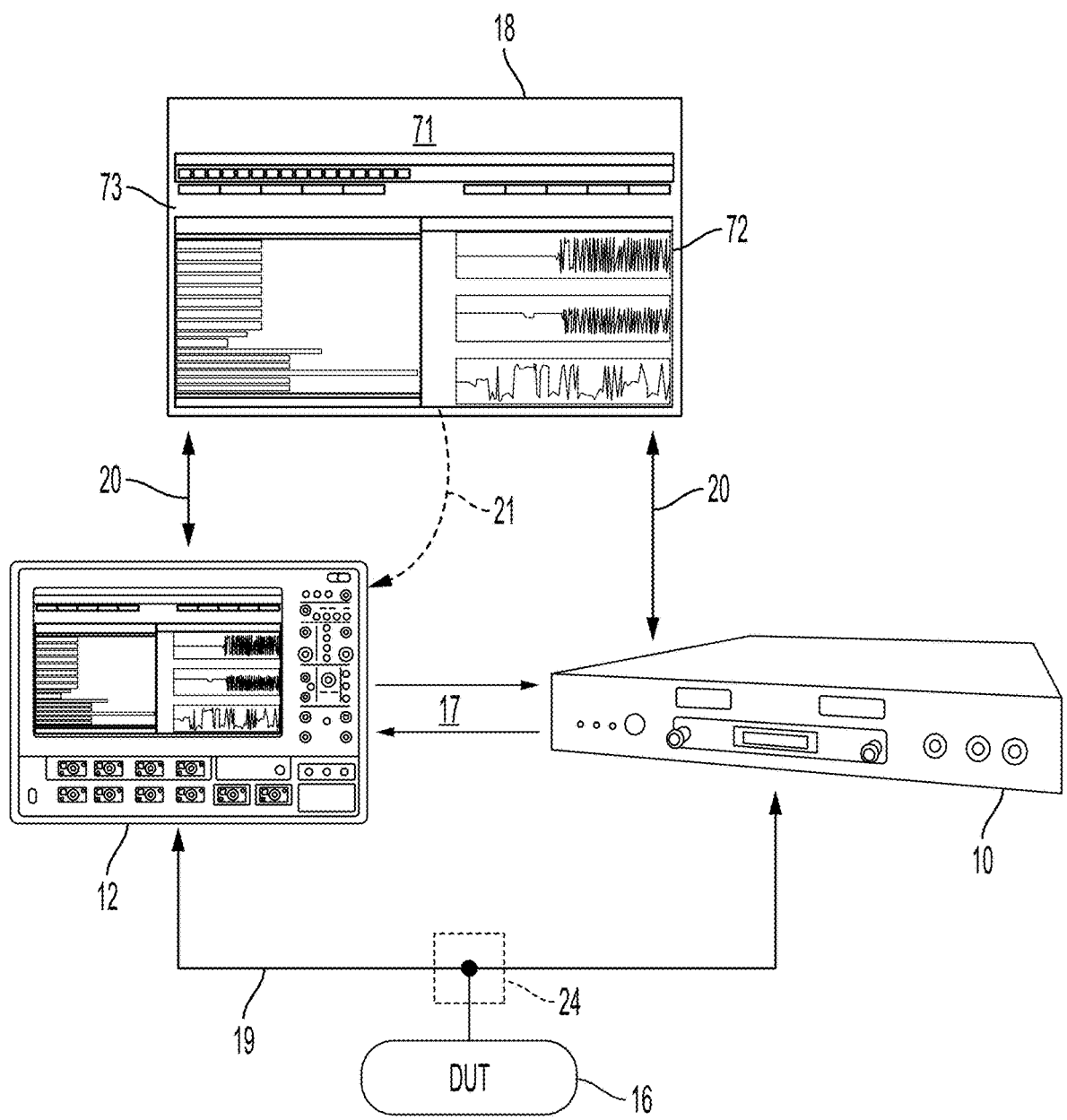
FIG. 3 shows integrated protocol and physical layer analysis, in accordance with at least one aspect of the present disclosure.

FIG. 3 shows conceptually how a system for simultaneous physical layer and protocol analysis is configured. The DUT [16] is seen providing serial data signals [19] to both a digital oscilloscope [12] and to a protocol analyzer [10]. This could be provided either directly or through the use of an interposer [24]. Mechanisms are provided (which will be described later) for maintaining adequate signal fidelity for capturing the physical layer signals with the digital oscilloscope [12] and for decoding the packets properly with the protocol analyzer [10]. The inventors refer to this capability as cross-probing.

Between the two instruments, cross triggers [17] are provided. These will be described later, but are the mechanisms by which each instrument (the digital oscilloscope [12] and protocol analyzer [10]) can trigger each other. The inventors refer to this capability as cross-triggering. Each instrument is able to trigger the other such that they acquire the same data simultaneously around the trigger point. The nominal trigger point displayed on the unit interval (UI) of both instruments can be the same with respect to the acquired data.

A computer and display [18] is shown connected to both the digital oscilloscope [12] and protocol analyzer [10] through data and control lines [20]. This computer and display [18] hosts the software capable of running the protocol analyzer [10] application and the subsequently described CrossSync application [71]. As all modern digital oscilloscope [12] instruments contain an embedded computer themselves, the computer and display [18] typically communicates with the digital oscilloscope [12] software through remote control. In a preferred aspect, all of the aforementioned software is hosted on the digital oscilloscope [12], as indicated by the dotted arrow [21]. Thus, the digital oscilloscope [12] itself is used to host its own software, the protocol analyzer [10] software, and the CrossSync application [71]. As a single computer and application has access to all of the physical layer data (in the form of oscilloscope waveforms) and the protocol analysis data (from the protocol analyzer [10]), the capability is enabled for seamless integration between the physical layer and protocol captures across both instruments, having the feel of a single software interface. When a user navigates through the trace on one instrument, the other should follow in lockstep. The inventors refer to the simultaneous analysis of both the physical layer waveforms and protocol data as cross-analysis.

The concept shown in FIG. 3 is applicable across all protocol technologies—this may mean some technology-specific implementations on the protocol analyzer and probing side, but all setup and user interface principles remain consistent across technologies.

Figure 4:
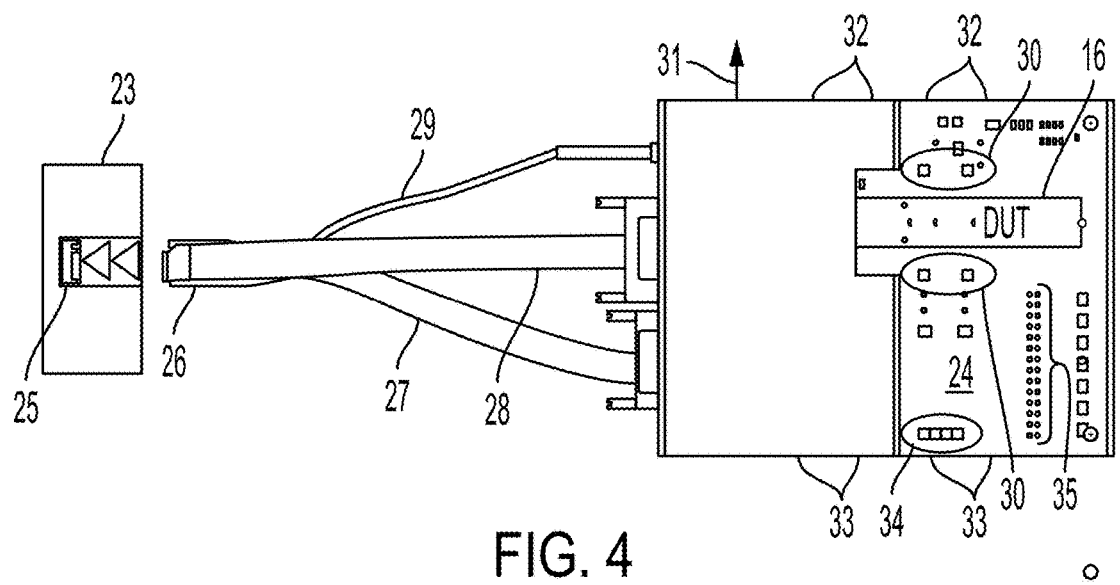
FIG. 4 shows an interposer for integrated protocol and physical layer analysis, in accordance with at least one aspect of the present disclosure.

Regarding cross-probing, the concept is to simultaneously acquire analog waveforms and high lane-count protocol traces with the same probes and interposers. FIG. 4 shows an exemplary M.2 interposer. M.2, formerly known as the Next Generation Form Factor (NGFF) is a specification for internally mounted computer expansion cards and associated connectors and is popular today for solid-state drives (SSDs). M.2 is a form factor and connector specification. The protocol here, without any loss of generality, is PCI-Express Gen 4. The host [23] is a computer motherboard with an M.2 interface. Under normal operation, the DUT [16] (for example, an SSD) plugs directly into the host [23] at the host slot [25]. Here, the DUT [16] is shown plugged into an interposer [24], and the interposer [24] is connected to the host [23] through a keyed paddle board [26] plugged into the host slot [25]. The keyed paddle board [26] is a connector that aggregates many signals from the interposer [24] including host sideband signals [27], host high speed signals [28], and host power [29]. All communications between the DUT [16] and the host [23] are made through the host sideband signals [27] and the host high speed signals [28], and the PCI-Express signals are passed to the protocol analyzer [10] (not shown in FIG. 4) through the iPass cable [31] (part number PE021UCA-X).

Most discussions thus far regarding the host [23], interposer [24], DUT [16], and protocol analyzer [10] is the current state-of-the-art for protocol analysis.

For simultaneous protocol and physical layer analysis, notable additions have been made to the interposer [24].

First, upstream port signals [32] and downstream port signals [33] are provided. These are physical copies of the host high speed signals [28] sent between the host [23] and the DUT [16], which are picked off and sent to the protocol analyzer [10]. The conditioning of these signals will be discussed later in this document, but basically these signals are meant for acquisition by the digital oscilloscope [12] (not shown in FIG. 4). In this situation, these are four lanes each of upstream port signals [32] and downstream port signals [33] and are meant to preferably be acquired through a high-speed active differential probe, which is plugged into the digital oscilloscope [12].

Additionally, sideband signal monitoring points [35] are provided that can also be probed by the digital oscilloscope [12]. These are slower signals, so probing points are provided for these.

Of particular interest in simultaneous protocol and physical layer analysis is the reference clock used to generate the serial data signals. Therefore, reference clock monitoring points [34] are provided to be probed and acquired by the digital oscilloscope [12].

Finally, power integrity is also important in physical layer testing and power problems can cause protocol errors or protocol events. To simultaneously perform protocol and power integrity analysis, voltage/current monitoring points [30] are provided.

A protocol analyzer interposer [24] allows the monitoring of the communication between a host [23] and the DUT [16]. The signals are picked off and sent to the protocol analyzer [10] which analyze and report the structure and content of the protocol.

The protocol analyzer [10] typically uses an interposer [24], allowing the capture of multiple high-speed lanes simultaneously. The interposer [24] is specific to a specific form factor (where here, M.2 is shown). In addition to the host high speed signals [28], host sideband signals [27] also must be captured and sent to the protocol analyzer [10].

The cross-probing interposer [24] shown in FIG. 4 is capable of sending an analog copy of any signal to both protocol and physical layer acquisition tools.

It is preferable that the captured signal sent to an oscilloscope is sent with the proper type of probe or cable in order to maintain the highest signal fidelity.

There are multiple signals on a given interface that one might want to monitor, such as:
 1. high-speed clock and data,
 2. protocol sideband signals,
 3. voltage levels at the DUT, and
 4. current consumed by the DUT.

For the high-speed interface, the probing technology should minimize the impact on the signal, so that the signal fidelity is not compromised. Moreover, proper design of the area where the probe is attached can optimize signal fidelity and minimize probe loading. In any case a high-impedance, high-frequency probe tip technology should be used. It is advantageous for the probe tip used to connect to the high-speed trace to contain embedded information about its frequency response. This allows digital signal processing (DSP) techniques to be used to correct for the frequency response of the probe amplifier and probe tip. Finally, by measuring the response of the interconnect system, the fixture can be de-embedded. Ideally the interposer and the interconnect system are transparent and the measurements on the oscilloscope can be considered similar to what the DUT [16] or the host [23] sees. Probe tips used for high frequency measurements are often implemented in such a way that the customer needs to solder the tip to the signal trace. Since this is a delicate process, depending on the mechanical configuration, it is advantageous to build the probe tip part into the interposer [24]. In an alternative embodiment, the interposer has a connection for a temporary attachment of a probe tip. The interposer is designed to have the probes as close as possible to the available termination. Since the tip holds its own frequency response data, the system can always figure out how correct itself. Analog probing of real-time high speed signals can be done using the interposer [24] with permanent probes attached to it. The frequency response characteristics are stored in the permanent probes that is permanently attached to the interposer [24]. The frequency response characteristic data can be used to do signal compensation provided by the oscilloscope through the DSP. The permanent probe is positioned on the interposer [24] for measuring high speed signals on the interposer [24]. In a preferred aspect, pads specially designed to attach to the probe of the interposer [24] are provided. The pads are designed to permanently attach the probe are large enough to solder the probe to the board. This may act as extra loading on the line. By selecting proper dimensions of the pads, the pad could be capacitive, inductive, or a combination of the two. This allows the pad to compensate and have the right impedance for the transmission system. The pad can also use probe loading as a fix, when the probe is soldered to the pad the combination of the loading of the probe and the loading of the pad compensate each other. Preferably during high speed digital signal probing, the DSP has the ability to de-embed the effects of the interposer [24] from the signal when a permanent probe is attached.

The sideband signals also ought not to be disturbed. This can happen by probe loading or by a slip of the probe to a different signal, potentially resetting or interrupting the communication system. In the interposer [24], signal replication allows signal drive to the protocol analyzer. A second replica is sent to the signal to a test point that can be probed by an oscilloscope. Furthermore, electrostatic discharge (ESD) protection can be incorporated so that the driver of the sideband signals can be protected. To replicate those sideband signals, comparators or analog amplifiers can be used, there are circuits that allow this to be implemented by installing different components.

Power supply (voltage and current) waveforms might indicate important information regarding the behavior of the DUT [16]. Therefore, monitoring voltage and current at the voltage/current monitoring points [30] allows for easy probing with an oscilloscope as required.

The M.2 host [23] in FIG. 4 is a motherboard with an M.2 PCI-Express Gen 4 interface. The M.2 interface can be used to connect, for example, an M.2 PCI-Express Gen 4 SSD drive. To test such an interface for protocol and physical layer functionality, a protocol analyzer and an oscilloscope can be used. Each device, DUT [16], protocol analyzer [10] and digital oscilloscope [12], needs a copy of the signals and each of them have different requirements. To do so an interposer [24] is designed to act as an analog signal processing conditioner. As shown in FIG. 4, it is possible to group the M.2 interface signals in 3 different categories: host sideband signals [27], host high speed signals [28], and host power [29].

Figure 5:
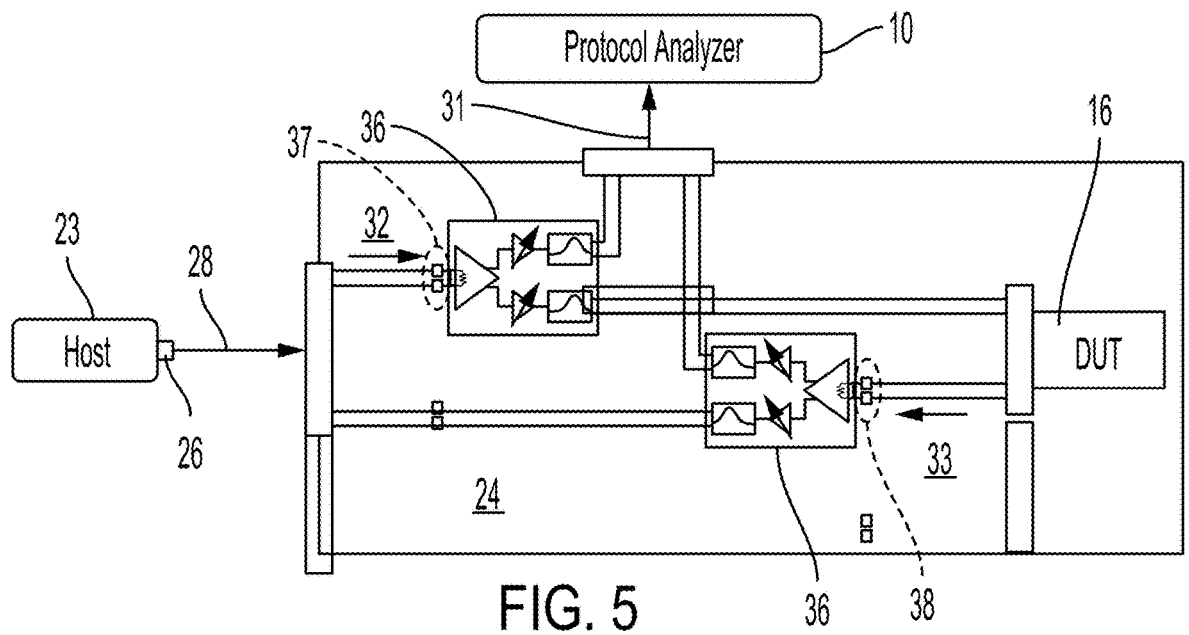
FIG. 5 is a functional diagram for simultaneous physical layer and protocol testing of high-speed signals, in accordance with at least one aspect of the present disclosure.

FIG. 5 is a functional diagram showing how the high-speed signals are dealt with in a preferred implementation. Note that there could be a plurality of high-speed signals in a given protocol, FIG. 5 shows only two signals (with the understanding that when required, more are provided): upstream port signals [32] (a high-speed signal going from the host [23] to the DUT [16] closest to the host [23] going downstream), and downstream port signals [33] (a high-speed signal from the DUT [16] to the host [23] closest to the DUT [16] going upstream). In the M.2 interface there are eight high-speed signals: four downstream signals and four upstream signals.

For the high-speed data signals the preferred requirements are the following:

1. The DUT requirement is for the interposer [24] to be as transparent as possible, in other words any degradation of the signal due to cables losses, connector losses or printer circuit board losses need to be compensated by an amplifier/equalizer [36] integrated circuit (IC) or ICs in the interposer [24]. An amplifier/equalizer [36] includes preferably a variable gain amplifier (VGA), a frequency response equalizer, and means for fan out of multiple signals. Good signal fidelity needs to be maintained across the interfaces in order to prevent further degradation of the signal going to the DUT [16]. In general, these elements are necessary at very high speed where the signal losses through the signal path are important; at lower speeds this circuit can be set to unity gain and equalized to a flat response. The overall objective is to make the signal at the interface to the DUT [16] the same as the signal at the host slot [25].
2. The protocol analyzer requirement is to recover digital ones and zeros from the communication. Inside the protocol analyzer [10], complex signal recovery mechanisms exist to recover signals that are substantially degraded. Also, the iPass cable [31] is required to connect the interposer [24] to the protocol analyzer [10]. Again, the objective of the amplifier/equalizer [36] circuits is to be set up such that the protocol analyzer receives a signal having the best possible characteristics to be recovered and processed by the analyzer. This means that the amplifier/equalizer [36] may not be set up for the best signal fidelity, but for the best signal recovery. In other words, the objective is not to faithfully replicate the analog waveform, but to enhance the possibility of decoding the waveform.
3. The oscilloscope measurement is performed in front of the amplifier/equalizer [36] at the upstream port probe connections [37] and downstream port probe connections [38]. Modern oscilloscopes can perform DSP functions to de-embed the degradation of the signal captured by the probing system in a non-ideal location in the circuit. In this case, the degradation of the probe loading, the signal path on the interposer [24], the host [23] to interposer [24] cable (host high speed signals [28]) as well as the connectors can be removed as from the acquired signal. To do so, an electrical model of them is required, which can be measured or generated, for example by simulation. As the signal is probed in front of the amplifier, the influence of the probe on the signal is defined as probe loading. Probe loading effects on the transmission line can be de-embedded in the oscilloscope. That said, its effect cannot be easily removed from the signal going to the DUT [16], so proper consideration is required when designing the upstream port probe connections [37] and downstream port probe connections [38] where the probe will be connected to the signal, as described in U.S. Pat. Nos. 7,660,685 and 8,170,820, titled "Virtual Probing" to P. Pupalaikis et al, each of which is herein incorporated by reference in its entirety.

The host sideband signals [27] are a collection of status signals, clock, and low speed communication used to manage the high-speed interface. A signal of particular interest among the host sideband signals [27] is the clock.

Figure 6:
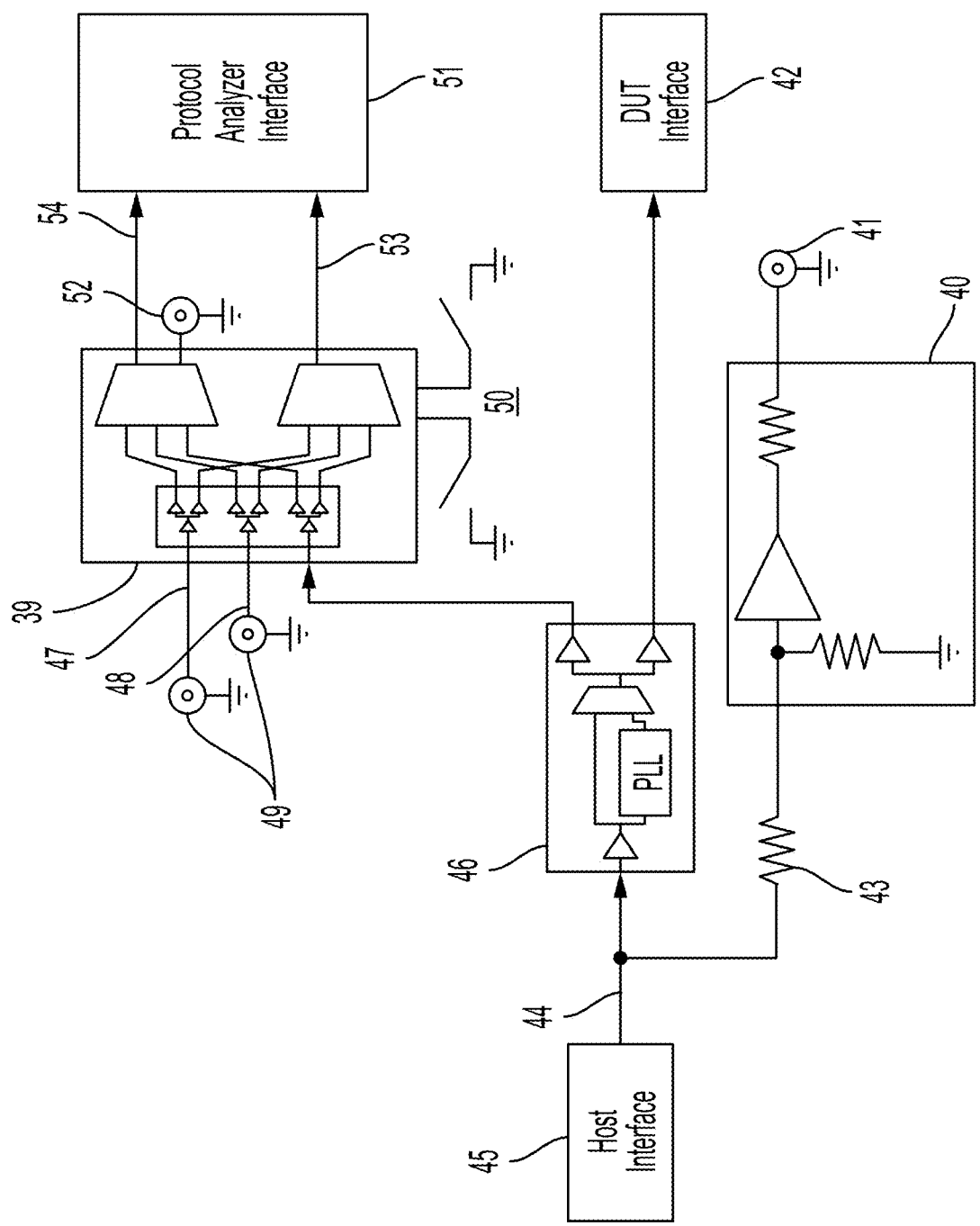
FIG. 6 shows a method of exposing a reference clock, in accordance with at least one aspect of the present disclosure.

With reference now to FIG. 6, although categorized as a sideband signal, the reference clock coming from the M.2 host interface [45] needs special care as the jitter requirements are quite tight. The interposer [24] needs to provide the host reference clock [44] coming from the M.2 host interface [45] to the M.2 DUT interface [42] as well as to the protocol analyzer interface [51]. This is done by creating several copies of the host reference clock [44]. It is possible that the DUT [16] may not use that particular clock as it might recover the clock from the digital signal itself using a phase locked loop (PLL) with a proper filter response to minimize noise impact on jitter and to allow the system to function when the clock is using spread-spectrum clocking (SSC) techniques. The protocol analyzer needs two copies of the host reference clock [44], the protocol analyzer reference clock downstream [53] and the protocol analyzer reference clock upstream [54]. These two copies are used to manage the upstream link and the downstream link in the protocol analyzer. It is possible that the customer may want to use an external clock to drive the protocol analyzer upstream and downstream clock through the external reference clock upstream [47] and external reference clock downstream [48]. The interposer [24] is designed to allow such clocks to be injected at the external clock input coaxial connectors [49]. In order to monitor the analog characteristics of the host reference clock [44], it is not recommended to create a copy through a PLL based driver [46] or some form of comparator. Those devices may hide some of the analog characteristics of the host reference clock [44], like common mode noise or high frequency jitter, therefore an analog reproduction through a linear clock amplifier [40] of the host reference clock [44] is recommended. The interposer [24] probes the clock signal. The analog probing of the clock signal preferably is done through an ESD protected wideband buffer. The protected wideband buffer avoids interference to the clock signal, which would impair communication. Probing is preferably done where the clock signal is received by the interposer [24] to preserve its original analog characteristics. This allows the oscilloscope [12] to be able to analyze the signal. The clock can be probed with two single ended buffers in order to capture two independent signals so the scope can analyze differential and common mode characteristics.

The linear clock amplifier [40] has many signal path requirements. A preferred aspect shows the linear clock amplifier [40] being reproduced with a PLL based driver [46] buffer having two outputs, the first going to the M.2 DUT interface [42] and a second going to a 4×4 cross-point switch [39]. In this implementation only three inputs and three outputs are used on the 4×4 cross-point switch [39]. The copy from the PLL based driver [46] is sent to the 4×4 cross-point switch [39]. Two external clock input coaxial connectors [49] are the other two inputs. The selection of which input is routed to which output is performed by a set of selection switches [50]. The user would set those selection switches [50] to decide which clock to use as sources for the protocol analyzer interface [51]. It is possible to select different reference clocks for the upstream and downstream monitoring links on the protocol analyzer interface [51], those would be referred as protocol analyzer reference clock upstream [54] and protocol analyzer reference clock downstream [53]. The protocol analyzer reference clock monitor [52] can be used to monitor any of the inputs of the 4×4 cross-point switch [39] with an instrument such as an oscilloscope.

As stated earlier, it is desirable to monitor the host reference clock [44] directly prior to regeneration by the PLL based driver [46], so a low noise probing circuit comprised of a pick-off resistor [43] and a linear clock amplifier [40] can be used to reproduce this signal such that it can be monitored through a host reference clock coaxial connector [41]. For simplicity, FIG. 6 shows a single connection, with the understanding that typically the host reference clock coaxial connector [41] is differential and there are two copies of the linear clock amplifier [40] pick-off resistor [43] and host reference clock coaxial connector [41] for providing a differential signal output. All monitoring points are designed so that they provide an easy interface to an instrument such as an oscilloscope.

The low speed communication signals are treated differently than the others. The interposer [24] needs to condition all the other sideband signals to the DUT and to the protocol analyzer, in order to comply with the protocol definition. Finally, to allow for probing, the signals are sent to a test point on the interposer [24]. ESD is a concern, as all of these lines are exposed to the user. Analog probing of control signals, such as digital sideband signals, is done on the interposer [24]. Preferentially probing is done through an ESD protected wideband buffer.

The remaining low speed communication signals are handled as follows: A high impedance logic re-driver is used to pick off the signal connecting the host and the DUT. This re-driver sends the signal to the field programmable gate array (FPGA) in the protocol analyzer that handles the communications. The purpose of the re-driver is to minimize the signal loading between the host and the DUT [16] and therefore limits its shape deterioration. A similar re-driver can be used to send a copy of that signal to an easily accessible test point. Since the test points are accessible by a customer, proper ESD protection needs to be applied to protect against ESD events. The circuit in FIG. 7 is provided in a preferred implementation.

Figure 7:
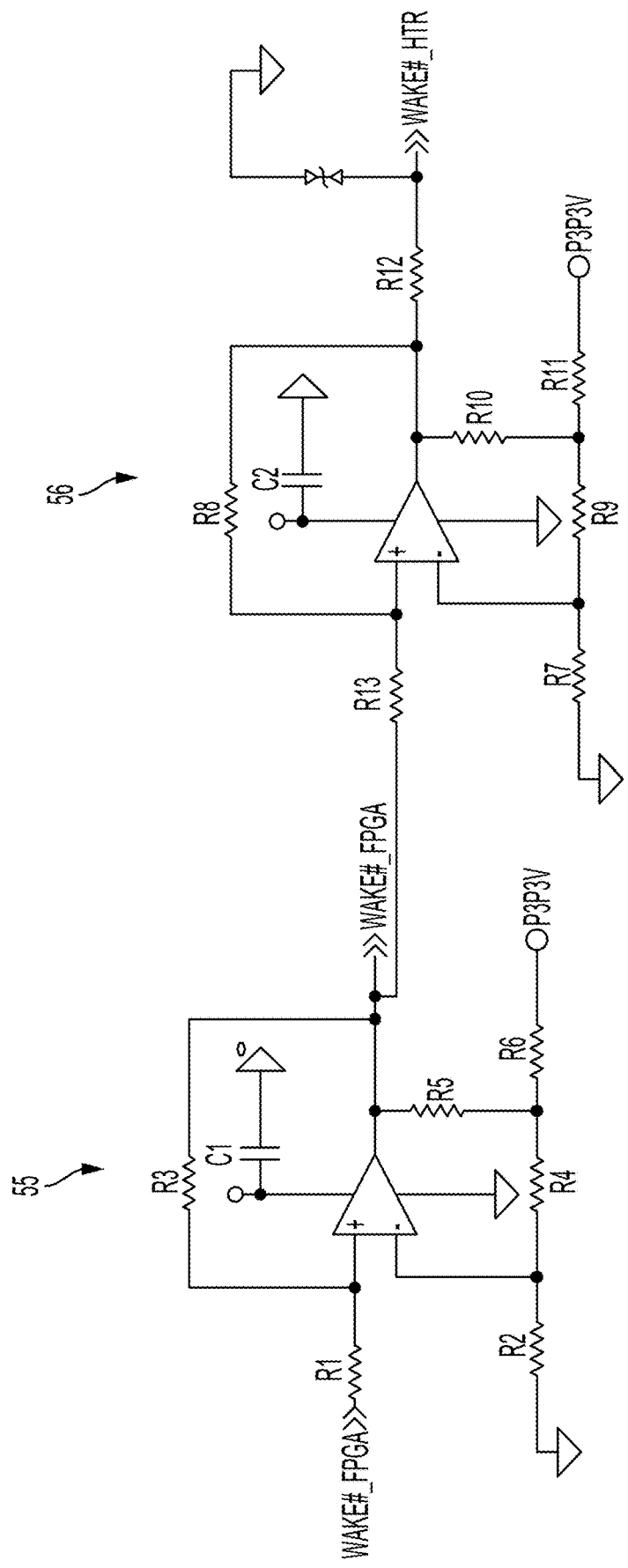
FIG. 7 is a schematic, in accordance with at least one aspect of the present disclosure.

As shown in FIG. 7, there are two stages designed so that the circuit can act as an amplifier replicating the shape of the signal or as a comparator with hysteresis to reshape the output to a logic 1 or 0; this is performed through the proper selection of resistors. The first stage [55] has a relatively high impedance which reduces the loading along the line between the host [23] and the DUT [16], thus maintaining good signal fidelity. Its output goes to a logic device managing the interface with the protocol analyzer. The second stage [56] is connected to an ESD protected test point. The same goes for the amplifier/comparator implementation in the second stage.

Many of the standard interfaces like M.2 or PCI-Express also provide power to the DUT. In this implementation the DUT power is provided by the host [23] through the host power [29]. This configuration has two benefits: the main interposer power never needs to be unplugged if a new DUT must be tested and the power supply can be monitored efficiently through the interposer. It is desirable to measure voltage and current on all the supplies, and to do so with reasonably high bandwidth in order to see how the supplies react to changes of state within the DUT. Preferentially the power supply voltage and current are probed on the interposer [24] and the signal is buffered to the oscilloscope [12].

Figure 8:
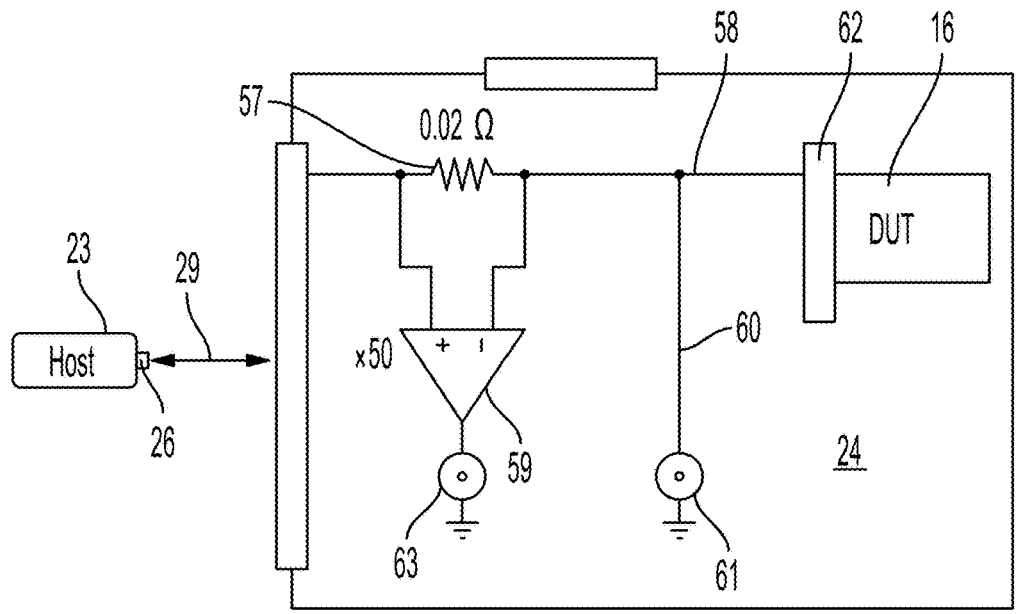
FIG. 8 is a schematic for voltage and current sensing, in accordance with at least one aspect of the present disclosure.

FIG. 8 is a simplified schematic showing how power and the power supplies are monitored for simultaneous measurement along with protocol analysis. A series low value resistor [57] meant for these types of measurements is connected between the interposer [24] and the DUT [16] in series along the DUT power rail [58]. A differential amplifier [59] captures the small voltage drop across the series low value resistor [57]. The gain of the differential amplifier [59] in conjunction with the value of the series low value resistor [57] is preferably set such that an easy 1V/A transfer function is obtained when measured at the current monitoring connector [63]. This makes it easy to analyze. A 50Ω transmission line [60] connects to the DUT power rail [58] as close to the DUT M.2 connector [62] as possible. This allows for the measurement of the voltage signal at that point with a probe like a power rail probe, otherwise it is measured at the voltage monitoring connector [61]. The power rail probe has a very high impedance at direct current (DC), limiting the extra current through the resistor to few microamps, but allowing the monitoring of the high frequency noise and variation of the power supply.

Figure 9:
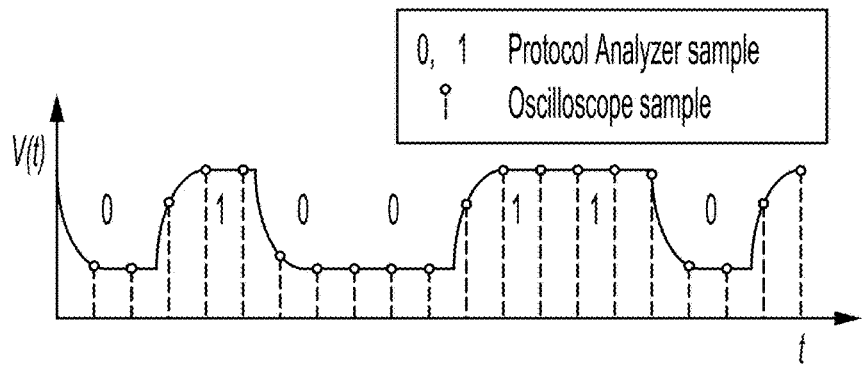
FIG. 9 shows a serial data signal as acquired by both the protocol analyzer and oscilloscope, in accordance with at least one aspect of the present disclosure.

Before talking about the cross-triggering concept, a description of the acquisition systems of both the oscilloscope and the protocol analyzer is required. In an oscilloscope the time between each sample in an acquisition is determined by the sample rate which can be considered as constant and the sample clock is periodic. On each clock transition the system digitizes the analog input and creates a sample whose number of bits is determined by the analog-to-digital converter (ADC). The sample rate is generally faster than the signal being measured; in the context of a high-speed serial data signal, multiple points per UI are acquired, creating much more information than a digital one or zero that the UI represents. This is shown conceptually in FIG. 9.

Figure 10:
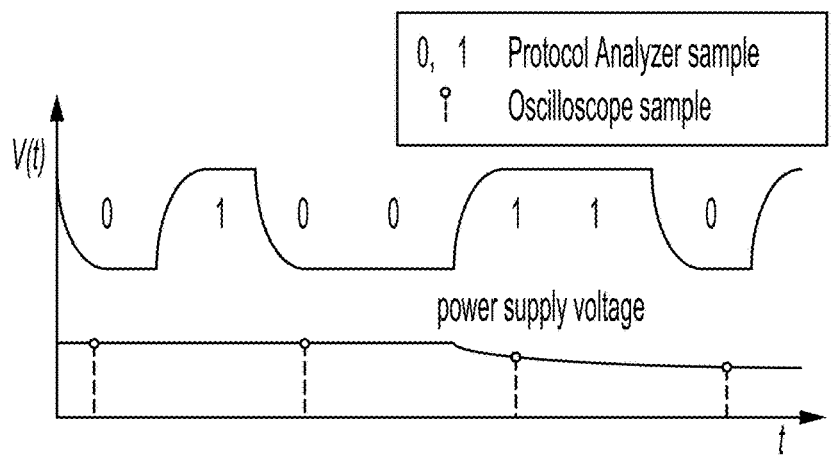
FIG. 10 shows a protocol analyzer acquiring protocol data while an oscilloscope simultaneously captures a low frequency signal such as a power supply, in accordance with at least one aspect of the present disclosure.

In an oscilloscope, the acquisition can also be run much slower therefore acquiring much less than one sample per UI. This is potentially useful when slow signals like power supplies are correlated to the protocol. This is shown conceptually in FIG. 10.

The protocol analyzer acquires the digital content of the bit streams, so in principle, the "sample rate" is one sample per UI and the word size is one bit, which means that for a slower protocol the acquisition can be longer in time. There are also ways to limit and determine what information is acquired. Also, from a memory point of view, the protocol analyzer has a different memory depth compared to an oscilloscope. So, the two instruments are acquiring at a different rate with different memory depths requiring careful consideration in order to make them work together. The trigger or the triggers enables the capability to reconcile the time with the data from both instruments. One can think of one aspect of the protocol analyzer to be a protocol smart trigger. The protocol analyzer trigger can be a single event or a cascaded set of events. When each event occurs the protocol analyzer marks the event with a pulse on its output trigger and stores the time of the event. This pulse is the input used by a oscilloscope to trigger in a cross-trigger arrangement. This allows the system to acquire a long protocol and for the oscilloscope to acquire the analog signal only when needed. With this principle implemented the oscilloscope acquisition can now be slow or fast, the protocol can be slow or fast or even changing speed, and it will be resynchronized to the trigger or to the triggers.

Similarly, the oscilloscope can capture events that the protocol analyzer would be blind to like power supply glitches, which may affect the behavior of the protocol. The oscilloscope can capture any other signal on the DUT itself which may be correlated to the protocol but not necessarily involved directly in the protocol communication itself. In these cases, the oscilloscope would be able to trigger the protocol analyzer and observe what is happening at the protocol level in the analog domain.

Figure 11:
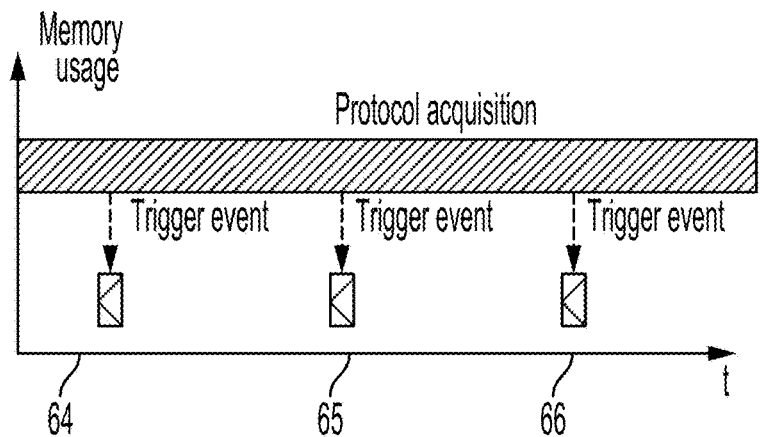
FIG. 11 shows protocol analyzer and oscilloscope segmented memory acquisitions whereby the protocol analyzer is triggering the oscilloscope, in accordance with at least one aspect of the present disclosure.
Figure 12:
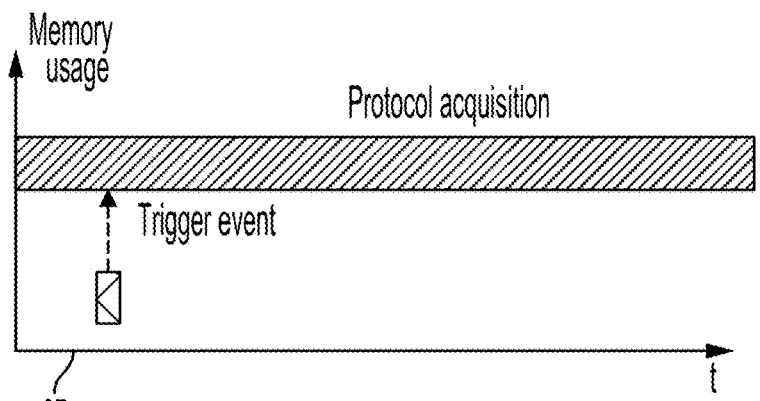
FIG. 12 shows protocol analyzer and oscilloscope memory acquisitions whereby the oscilloscope is triggering the protocol analyzer, in accordance with at least one aspect of the present disclosure.
Figure 13:
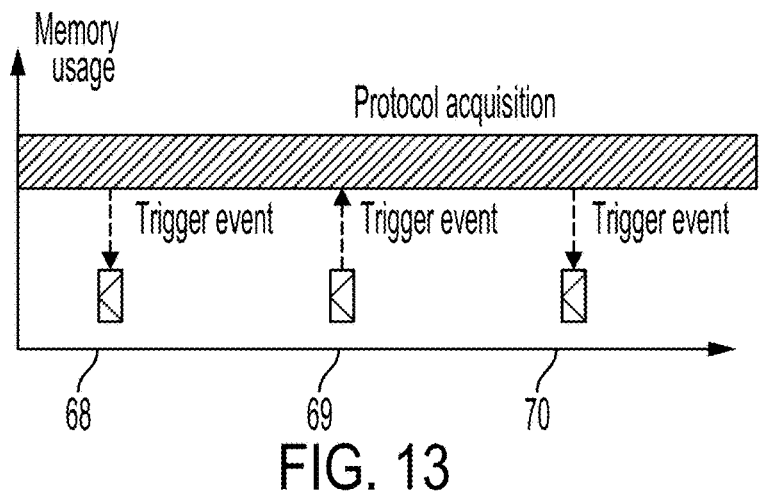
FIG. 13 shows protocol analyzer and oscilloscope memory acquisitions whereby each instrument is cross triggering the other, in accordance with at least one aspect of the present disclosure.

The cross-trigger capability therefore enables the protocol analyzer to generate trigger events such as at times time 1 [64], time 2 [65], and time 3 [66] in FIG. 11, where the oscilloscope acquisitions might be segmented acquisitions for reduce trigger dead time. Similarly, the oscilloscope may generate one or more triggers sent to the protocol analyzer, for example at time 1 [67] in FIG. 12. Finally, as shown in FIG. 13, the simultaneous protocol and physical layer analysis can be performed using data from mixtures of trigger events detected by each of the different instruments. In FIG. 13, the trigger times time 1 [68] and time 3 [70] are triggers provided by the protocol analyzer to the oscilloscope and the trigger time 2 [69] is the time of a trigger generated by the oscilloscope and provided to the protocol analyzer.

Regarding the oscilloscope software application, traditionally, the oscilloscope (digital or analog) captures the electrical signal (waveform) by physically probing at the electrical circuits at various nodes/locations and presents them as the time (x-axis) v/s amplitude (y-axis) display. In addition to displaying the signal's trace, it can perform mathematical processing on the captured waveform. This processing can be used to transform the entire waveform or to determine certain properties (features, parameters, measurements) of the captured signal. The processed waveform can be displayed as a trace waveform or calculated properties as individual values associated with a particular signal trace on the screen.

Regarding the protocol analyzer software application, the protocol analyzer captures and analyzes signal and data traffic over communication channels between multiple devices by probing or intercepting the physical signals and presents them as data packets in various fashions. The presentation of the data varies based on the type of communication and protocol. Typically, the protocol analyzer displays different types of communication details such as read operation, write operation, bulk transfers with source and destination information in various forms such as packets, transactions, split transactions, and so on. Each set of information is displayed in a time-ordered vertical list or any other form and can be selected for a detailed view for further analysis. In addition, it can also perform various analysis of the communication channels such as protocol validation, time analysis, channel usage efficiency, and so on.

Figure 14A:
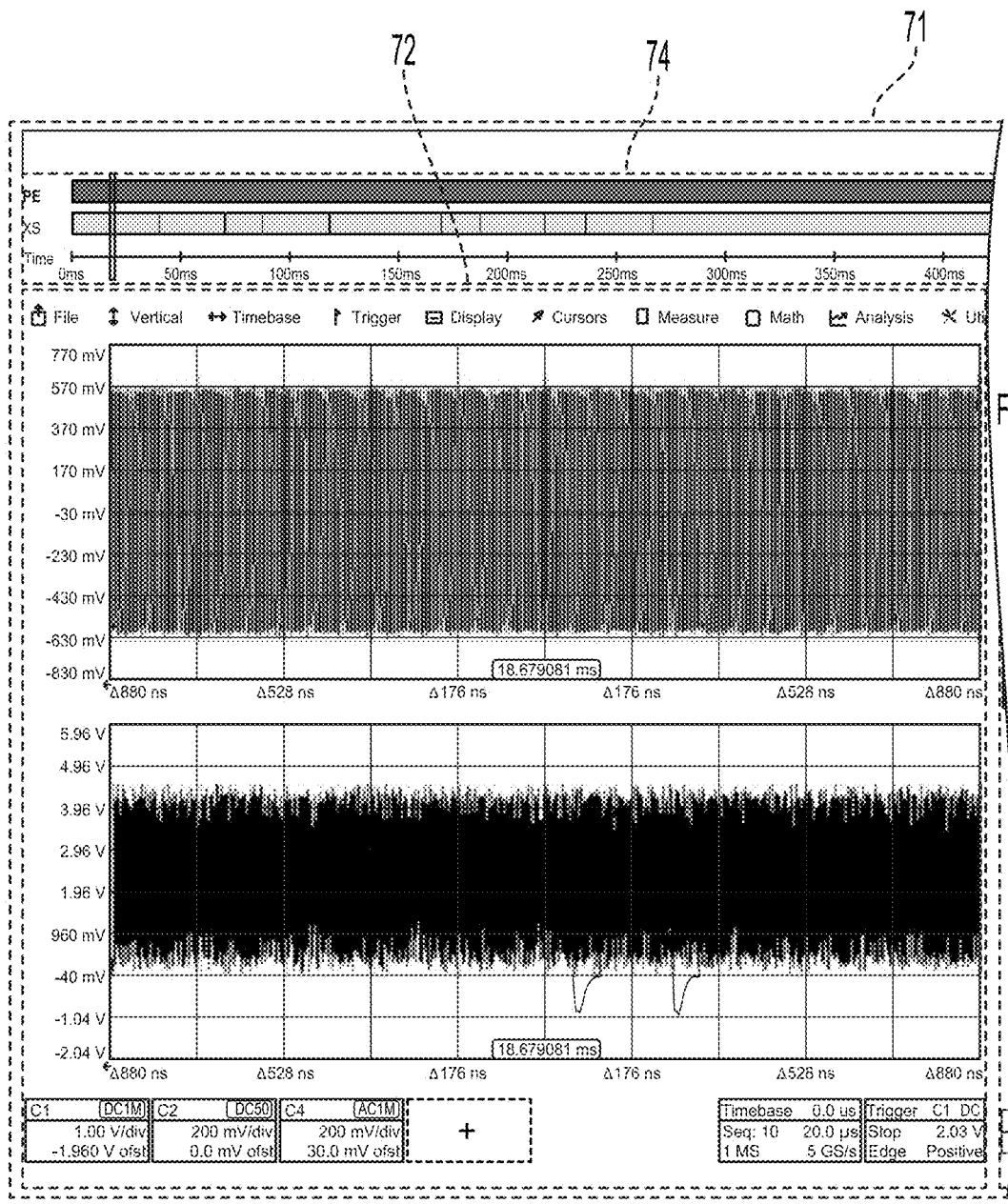
FIG. 14A is a partial screenshot of the CrossSync application, including the navigation bar, in accordance with at least one aspect of the present disclosure.
Figure 14B:
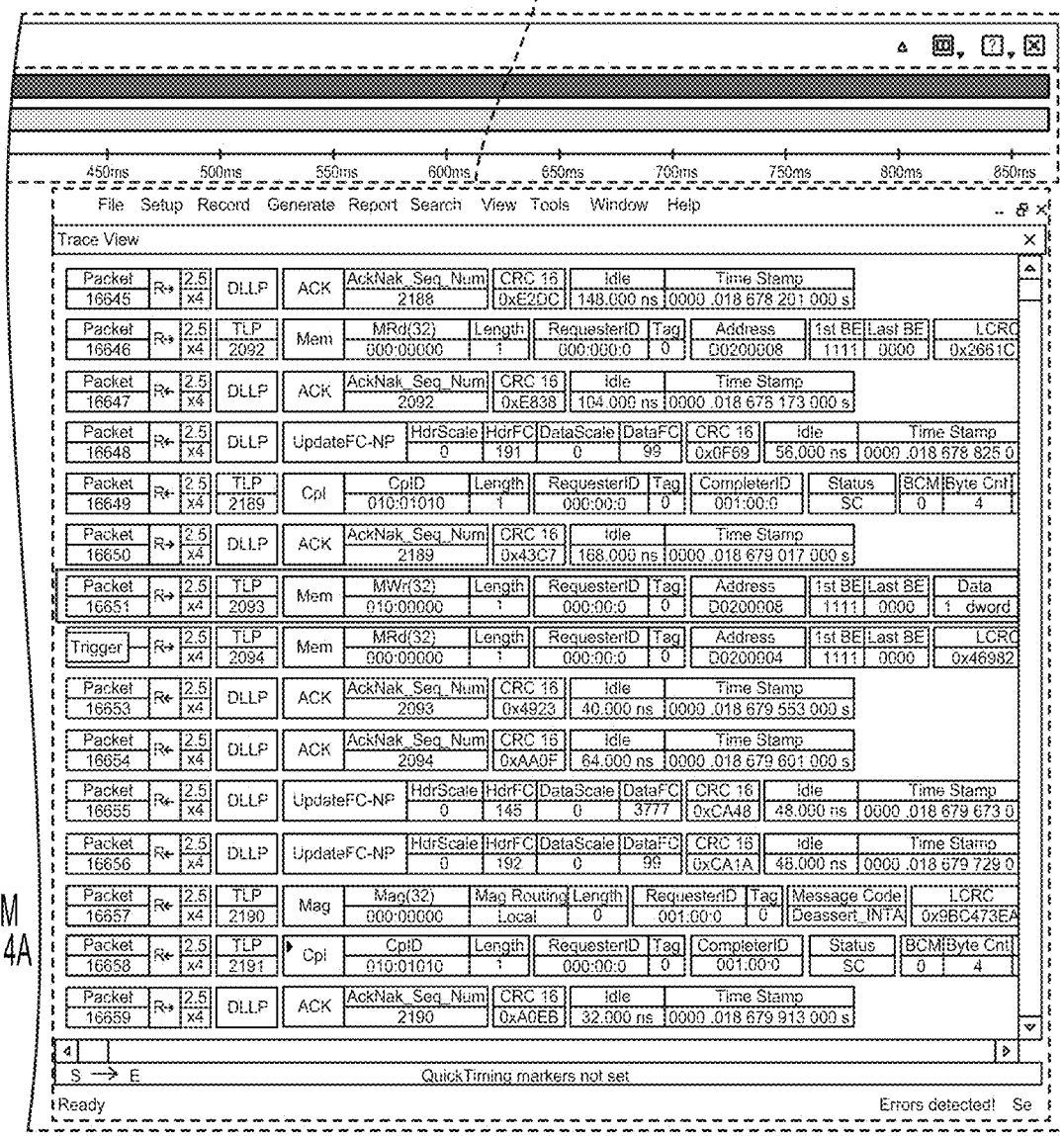
FIG. 14B is a partial screenshot of the CrossSync application, including the navigation bar, in accordance with at least one aspect of the present disclosure.

As shown FIGS. 14A-14B, the present disclosure provides an integration of different types of test and measurement instrument views such as a oscilloscope application view [72] and a protocol analyzer view [73]. The user interface of such a solution is achieved using a CrossSync application [71]. The CrossSync application [71 presents a user interface to capture, analyze, process, and manage data across multiple instruments. The oscilloscope application view [72] represents the user interface and displays as seen in the oscilloscope application. The protocol analyzer view [73] represents user interface and display as typically available in protocol analyzer applications. After capturing the waveforms, the CrossSync application [71] application will display a navigation bar [74] on top adjusting the oscilloscope application view [72] and protocol analyzer view [73].

Figure 15:
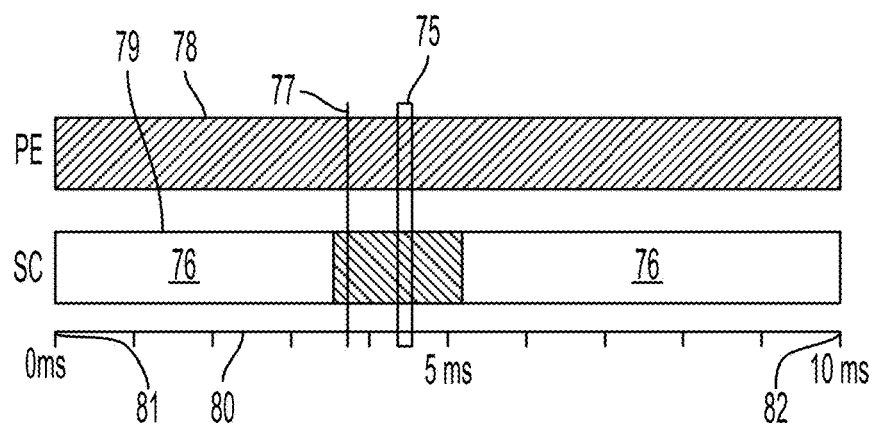
FIG. 15 is diagram depicting the navigation bar, in accordance with at least one aspect of the present disclosure.

The details of the navigation bar are shown in FIG. 15 where a protocol analyzer data bar [78] represents protocol data horizontally, and the oscilloscope data bar [79] represents the oscilloscope data horizontally, both on a common timescale [80]. For the case of more than two instruments connected via the CrossSync application, the navigation bar contains individual horizontal data bars for each instrument followed by the common timescale [80]. Each individual horizontal data bar represents the plurality of the compressed waveform data, cursors, various events associated with waveform data, and various types of errors, if detected.

The leftmost position of the x-axis and all waveform data in the navigation bar represents the start time of capture [81] and it is calculated as the earliest time of first data point amongst all instruments and is represented as time 0 s. The rightmost position of the x-axis and all waveform data in the navigation bar represents the stop time of capture [82] and it is calculated as the difference between the earliest time of the first data point amongst all instruments and the latest time of the last data point amongst all instruments.

The waveform data from multiple instruments are aligned across the data bar such that the vertical cross-section of each horizontal bar represents time-aligned data amongst multiple instruments and the vertical cross-section of the common timescale [80] represents the relative time of the data with respect to the start time of capture [81].

When the instrument does not contain information associated with time represented in the navigation bar, the semitransparent rectangle is used to represent missing information, for example the regions of no oscilloscope data [76]. The annotation inside the horizontal bar can use the plurality of the rectangle filled box, rectangle empty box, vertical lines, horizontal lines, and pixels in multiple colors. The common timescale [80] is represented as a horizontal line under the last horizontal data bar with vertical markers and labels where the labels may display information in time at a regular time interval.

The trigger point [77] between multiple instruments is represented as a vertical line. The current view [75] of data waveform in the oscilloscope and protocol analyzer is represented as an overlaying rectangle box.

Figure 17A:
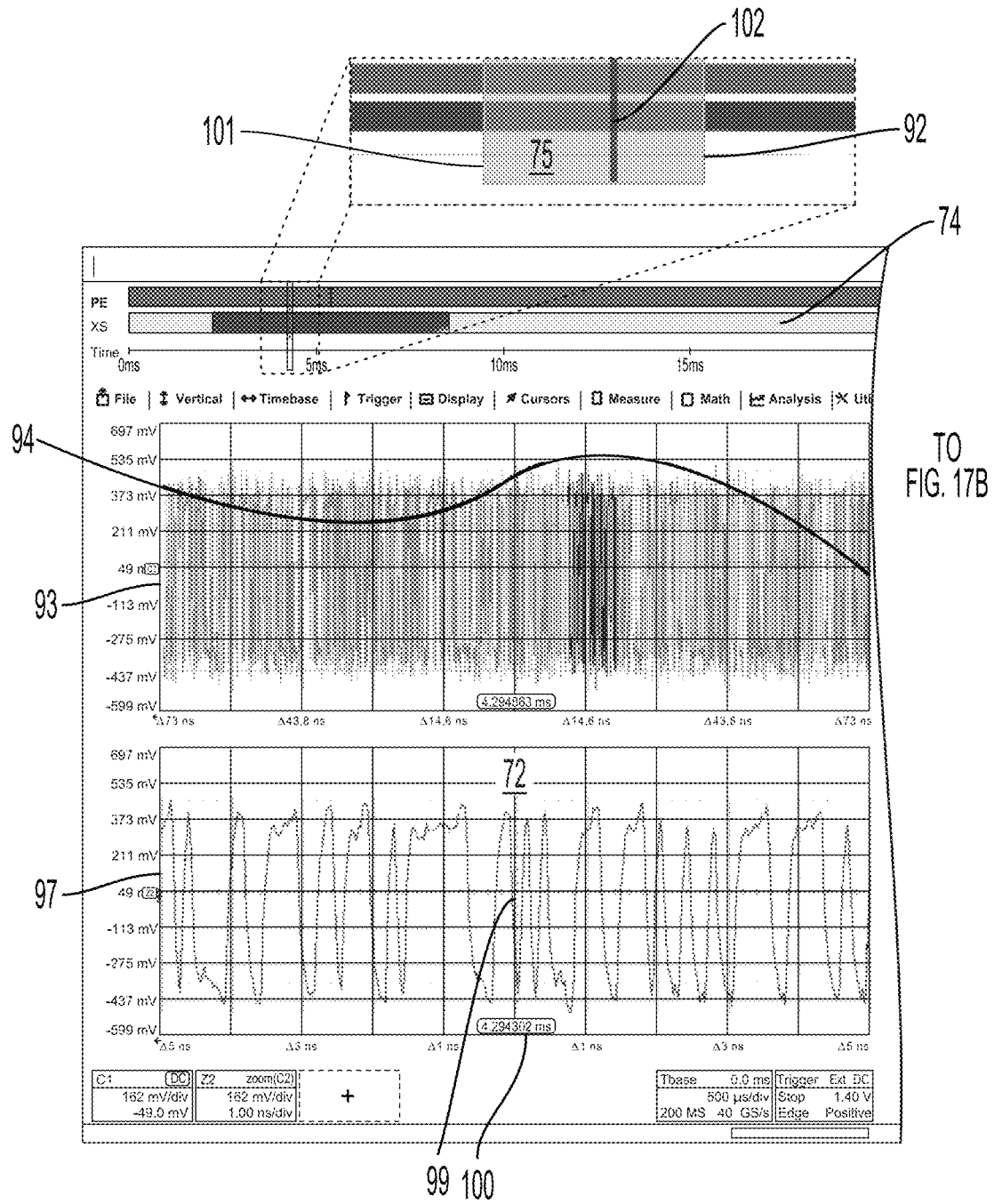
FIG. 17A is a partial screenshot of the CrossSync application with a detailed view of the navigation bar whereby the time synchronization of the views is illustrated, in accordance with at least one aspect of the present disclosure.
Figure 17B:
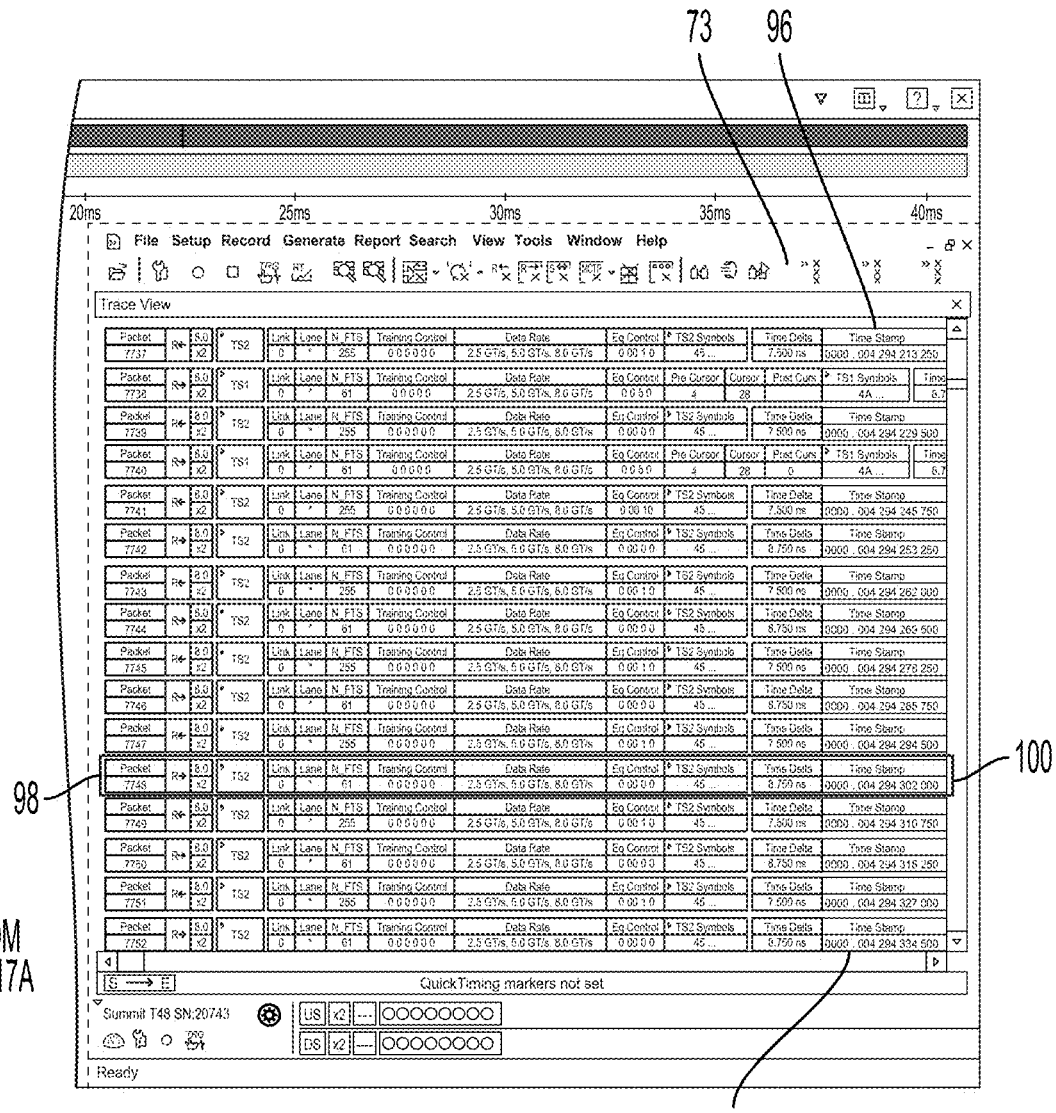
FIG. 17B is a partial screenshot of the CrossSync application with a detailed view of the navigation bar whereby the time synchronization of the views is illustrated, in accordance with at least one aspect of the present disclosure.

The time synchronization of the views is illustrated in FIGS. 17A-17B.

The oscilloscope application view [72] typically represents the captured wave-form data as channel traces in a single or multiple grid arrangement in time (x-axis) versus amplitude (y-axis) form. The protocol analyzer view [73] represents data as rows of packets with an individual field in each row representing the various type of information related to data elements where the packet rows are typical in ascending time order. The time delta between multiple rows in the protocol is determined by the data contents and grouping of the data and typically varies. In the time-synchronized view of the system, the oscilloscope channel trace view is set such as the time representing the beginning of oscilloscope channel trace view [93] is the same time representing the beginning of the protocol trace [96] and the time representing the end of the oscilloscope channel trace view [94] is same time representing the end of the protocol trace [95]. The navigation bar [74] represents the current view of the oscilloscope and protocol analyzer traces as a transparent rectangle overlaying all data bars showing the current view [75]. The timing relation between the oscilloscope and protocol analyzer is maintained for full capture length of the system. The navigation bar [74] indicates the extent of both the oscilloscope and protocol analyzer captures where the beginning of the view in the navigation bar [101] indicates the beginning time of the application views and the end of the view in the navigation bar [92] indicates the end time of the application views.

Regarding the selected packet and zoom synchronization shown in FIGS. 17A-17B, the oscilloscope application view [72] can display part of the channel waveform as an oscilloscope zoom trace [97] on a separate grid or same grid. The protocol analyzer view [73] allows the user to choose a protocol analyzer selected packet [98] for further analysis inside the application. The oscilloscope zoom trace center [99] is aligned with the time of the protocol analyzer selected packet [100] in the protocol analyzer. In the navigation bar [74], the location of the protocol analyzer selected packet [98] and the oscilloscope zoom trace center [99] is indicated by the navigation bar selected packet indicator [102]. When the user selects a different packet in the protocol analyzer, the zoom position will be adjusted to reflect the time of the new packet. The time scale of the zoomed waveform may not change with this operation and the user can independently change the scale to display waveform before and after the selected packet.

The navigation bar [74] allows various control of the views of the traces in the oscilloscope application view [72] and the protocol analyzer view [73] using mouse or touch panel control. By holding down the mouse button or by pressing against the touch panel with the pointing device at the point representing time 1 and moving the mouse or pointing device to a different point representing time 2 inside the navigation bar [74], a square area can be selected. This action will set the beginning of the oscilloscope channel trace view and beginning of protocol analyzer trace view to time 1 and end of oscilloscope channel trace view and end of protocol analyzer trace view to time 2. If more than two instruments are connected in the system, it will set views of the all instruments between time 1 and time 2. The position of the oscilloscope and protocol analyzer views can also be changed by double-clicking in the navigation bar [74].

In one aspect, the navigation bar [74] may be configured to display information for one oscilloscope and one protocol analyzer. The user interface for the navigation bar [74] uses a first computer based application to control and present a user interface of the digital oscilloscope where the user interface of the digital oscilloscope displays waveform traces in the time domain. The user interface for the navigation bar uses a second computer based application to control and present the user interface of the protocol analyzer type of instrument. The second computer based application displays the captured data in a protocol domain. A third computer based application communicates with the first computer based application and the second computer based application. The third computer based application also displays a summary of the waveform captured by the first computer based application and the second computer based application on a common timescale.

The user interface for the navigation bar [74] also may be configured to provide a summary view which displays various types of information. The various types of information can include but not limited to one of, any combination of, or all of trigger points, capture time, various errors, markers, and other user selectable information. The user interface for the navigation bar [74] also may be configured to display a first point from the digital oscilloscope and a first point of the protocol analyzer where the first point from the digital oscilloscope and the first point from the protocol analyzer are time synchronized. The user interface for the navigation bar [74] may be configured to change the position of a first view. The first view configured to be a view of the digital oscilloscope or a view of the protocol analyzer. Changing the position of the first view would change the position of the second view, where the second view is configured to be either a view of the digital oscilloscope or a view of the protocol analyzer. Preferably the first view is different than the second view. The summary view configured to navigate display views of the user interface using one, a combination, or all of a mouse, keyboard, touch screen, and other control devices. The user interface configured to select an individual item in protocol display, where selecting the individual item in protocol display opens a zoom view in the display of the oscilloscope. The time of the zoom in zoom view will represent the time selected packet in the protocol analyzer.

In another aspect, the navigation bar [74] may be configured to display information from one or more than one oscilloscope and one or more than one protocol analyzers. The user interface of the navigation bar uses a first computer based application to control and present a user interface of the digital oscilloscope such as displaying waveform traces in the time domain. The user interface of the navigation bar uses a plurality of second computer based applications to control and present a user interface of a plurality of protocol analyzer instruments. The second computer based application displays the captured data in a protocol domain. A third computer based application communicates with the first computer based application and the plurality of second computer based applications. The third computer based application is configured to display a summary of the waveform captured by the first computer based application and the plurality of second computer based applications on a common timescale.

The user interface for the navigation bar [74] also may be configured to provide a summary view which displays various types of information. The various types of information can include but not limited to one of, a combination of, or all of trigger points, capture time, various errors, markers, and other user selectable information. The user interface for the navigation bar [74] may be configured to display a first point in time from the digital oscilloscope and a plurality of first points in time for the plurality of protocol analyzers where the first point from the digital oscilloscope and the first point from the plurality of protocol analyzers are time synchronized. The first point in time for the user interface is the same first point in time for the oscilloscope and the plurality of protocol analyzers. The user interface for the navigation bar [74] may be configured to change the positions of a first view. The first view configured to be a view of the digital oscilloscope or a view of the plurality of protocol analyzers. Changing the position of the first view would change the position of the second view, where the second view is configured to be either a view of the digital oscilloscope or a view of the plurality of protocol analyzers. Preferably the first view is different than the second view. The summary view configured to navigate display views of the user interface using one, a combination, or all of a mouse, keyboard, touch screen, and other control devices. The user interface may be configured to select an individual item in protocol display, where selecting the individual item in protocol display opens a zoom view in the display of the oscilloscope. The time of the zoom in zoom view will represent the time selected packet in the protocol analyzer.

The oscilloscope instrument usually has multiple user interaction controls such as a physical front panel consisting of a plurality of knobs and buttons, mouse, touch panel, etc. The beginning of the channel view can be modified by any of the user interface controls. When channel waveform position and scales are changed using any available user interface presented by the oscilloscope application, the protocol analyzer view will also be changed such that time for the first packet in the protocol analyzer will be the same as the left edge of the channel waveform grid view.

Figure 16:
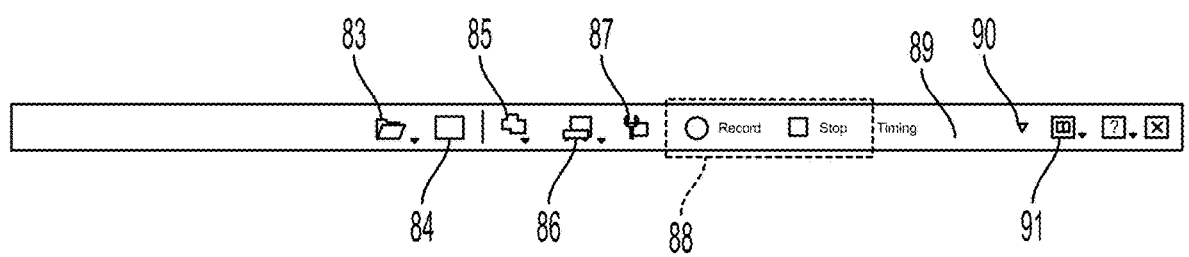
FIG. 16 is the detail of the control bar, in accordance with at least one aspect of the present disclosure.
Figure 18A:
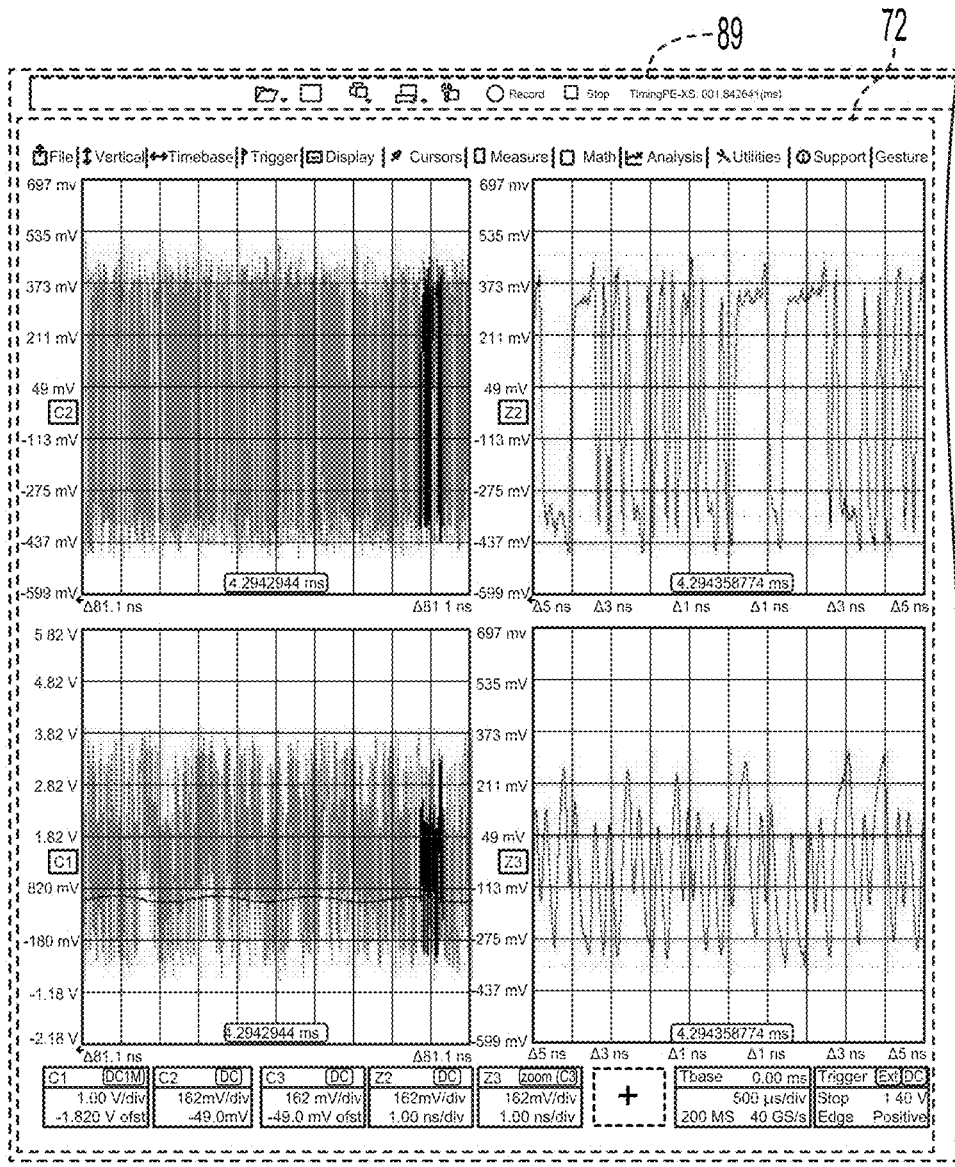
FIG. 18A is a partial screenshot of the CrossSync application, including the control bar, in accordance with at least one aspect of the present disclosure.
Figure 18B:
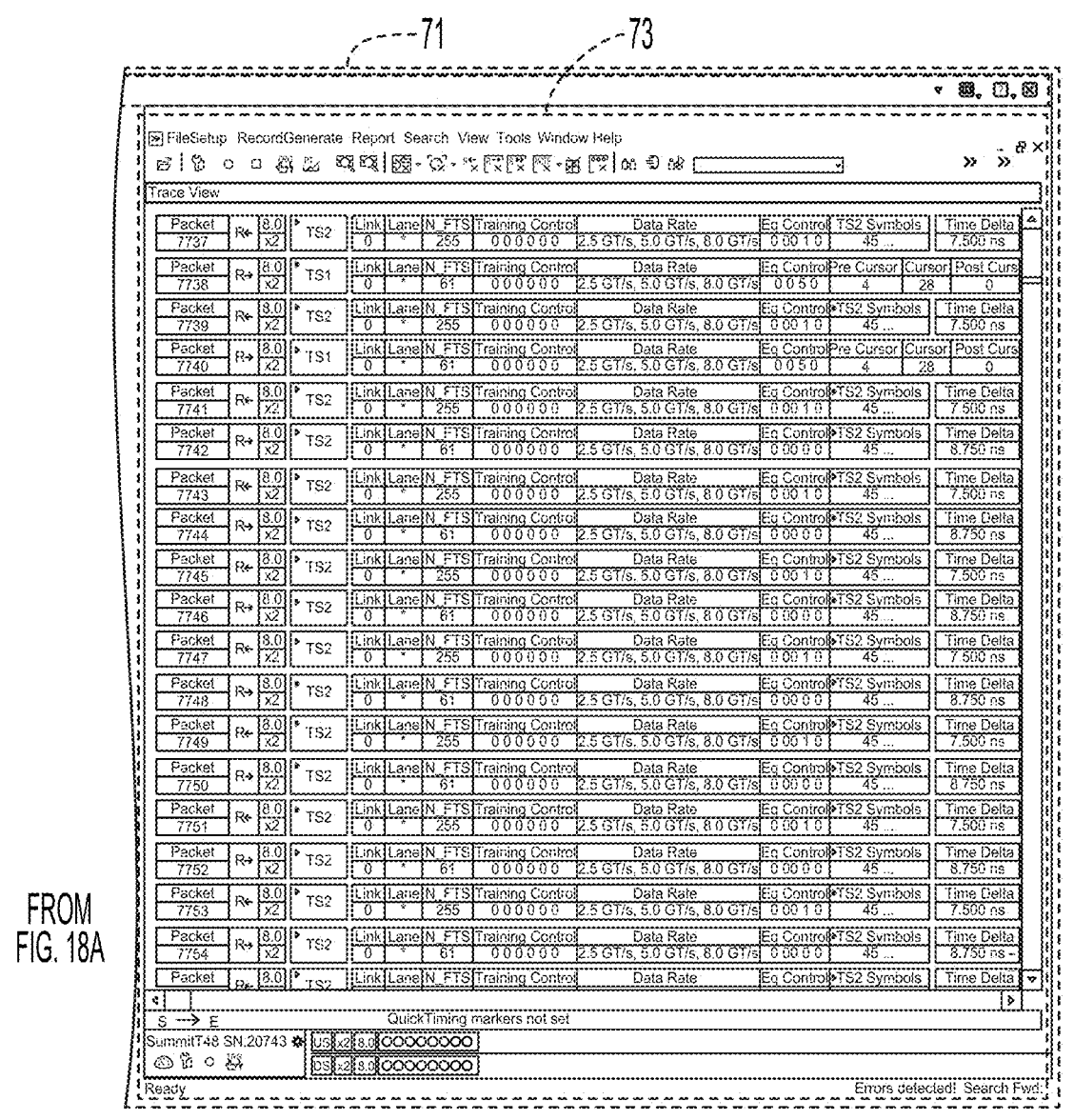

The protocol analyzer application usually contains a scroll bar for the protocol view. The scroll bar is used to scroll visible packets on the protocol analyzer application window. The protocol analyzer also has search capabilities allowing finding data inside trace based on various conditions. Upon completion of the search function, the protocol trace view is typically adjusted such that the searched data content is visible in the protocol analyzer application view. When protocol analyzer view is changed by any mechanism available to the protocol analyzer application, the oscilloscope application will adjust channel trace view such that start time of the channel view will be same as the start time of top packet in the protocol analyzer view and the end time of the channel view will be same as the end time bottom packet in the protocol analyzer view. The CrossSync application [71] also displays the control bar [89] instead of the navigation bar [74] on top of the view adjusting the vertical height of the oscilloscope application view [72] and the protocol analyzer view [73] as shown in FIGS. 18A-18B. This view of the CrossSync application [71] can be enabled by using the bar mode switch [90] on the control bar [89], whose detail is shown in FIG. 16. As shown in FIG. 16, the CrossSync application [71] control bar [89] presents multiple controls for various operations such as the selection of instruments, the trigger configuration [86], toolbox [87] selection, capture controls [88], the open file [83] menu, traces synchronization control [84], set applications layout [91] management, and switching the control bar [89] or navigation bar [74] views through the bar mode switch [90].

Figure 19:
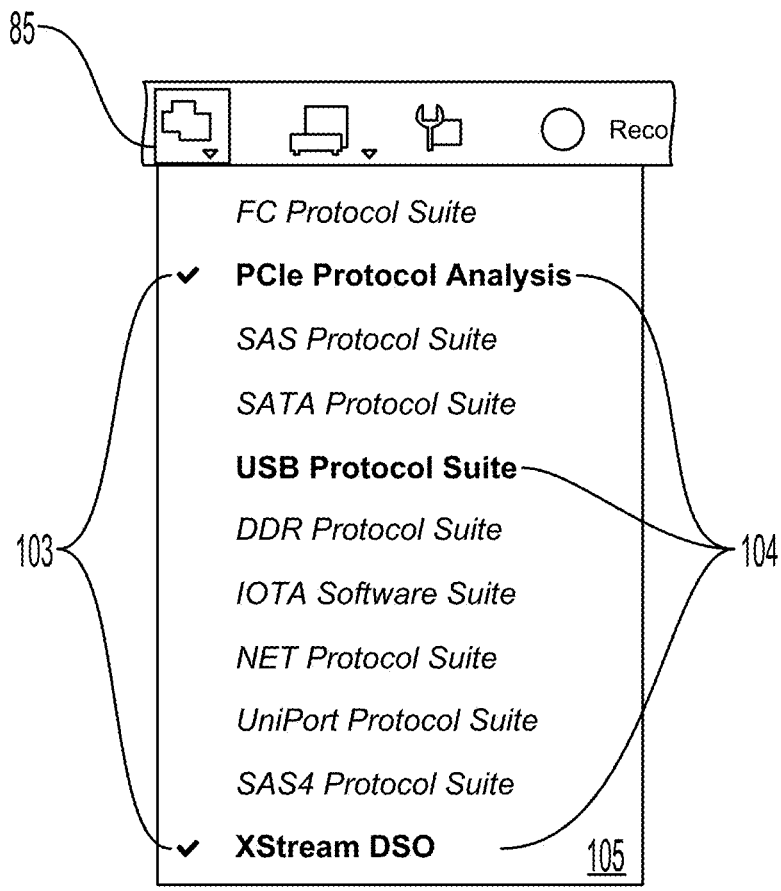
FIG. 19 shows the applications selection pull down menu, in accordance with at least one aspect of the present disclosure.

Through the applications selection [85], the CrossSync application [71] can be used to integrate the plurality of digital oscilloscope applications, fiber channel protocol analyzers, PCI-Express protocol analyzers, Serial Attached Small Computer System Interface (SAS) protocol analyzers, Serial Advanced Technology Attachment (SATA) protocol analyzers, Universal Serial Bus (USB) protocol analyzers, double data rate (DDR) memory protocol analyzers, and other protocol analyzers, as shown in FIG. 19. When a protocol analyzer application is installed in the system, it also installs the appropriate software application programming interfaces (APIs) and application libraries to participate in cross sync integration. The CrossSync application [71] builds a list of available instrument applications [104] using the installed applications and software APIs in the system. Using applications selection [85] in the control bar [89], the user can manage and connect to any installed and supported protocol analyzer software available in the system. The selected instrument applications [103] indicates which have been selected. When the user selects any available protocol analyzer or oscilloscope application, the associated application will be launched by CrossSync application [71] and it will be added in the synchronization system. The trace view and triggers are synchronized with added protocol analyzer applications upon capturing of a new trace. In the cross sync control bar [89], the trigger configuration [86] allows the user to select a number of instruments participating in data capture and trigger configuration. It also allows a user to select which instrument will be responsible to generate trigger conditions. The trigger condition can be generated by one or more instruments if the trigger timing does not conflict with each other. Each instrument participating in trigger generation can generate one or many events and any instrument participating in data capture can capture data using one or many trigger events. This system allows the placement of multiple waveforms associated with different triggers across multiple instruments. As shown in FIG. 11, the protocol analyzer has captured one long waveform while generating multiple trigger conditions at various times (time 1 [64], time 2 [65], time 3 [66]), the oscilloscope application has captured separate waveforms using available triggers at time 1 [64], time 2 [65], and time 3 [66]. The navigation bar represents one long waveform for the protocol analyzer while multiple waveforms from the oscilloscope are shown on a second data bar.

With the capture controls [88] presented in the control bar [89] in FIG. 16, the user can start capturing data of all selected applications. Until all instruments complete their capture, "Recording" control will remain unavailable. With the capture controls [88] "Stop" button, a capture can be interrupted at any time; all selected applications will stop data capture.

Traditionally, protocol analyzers work at the protocol bit rate and oscilloscopes work in real time. After every capture is complete, the CrossSync application applies time corrections from protocol analyzer to oscilloscope domain and vice versa to guarantee a time correlation between oscilloscope and protocol analyzer data.

Using traces synchronization control [84] presented in the control bar [89], the trace synchronization between multiple applications can be enabled and disabled at any time. This control allows for the monitoring and processing of captured data without any time correction.

The CrossSync application manages and controls all connected applications as a unique application. For the computer operating system (OS) display and layout management, all controlled applications are treated as a child window of the CrossSync application. Using common control presented in the control bar [89] in FIG. 16, application views can be automatically positioned using the last user configuration. Pressing the set applications layout [91] will display a popup window with the application layout setting [107] in FIG. 20.

Figure 20:
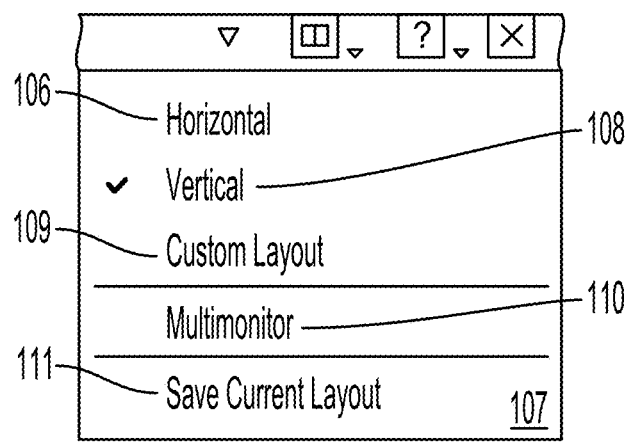
FIG. 20 shows the application layout pull down menu, in accordance with at least one aspect of the present disclosure.
Figure 21A:
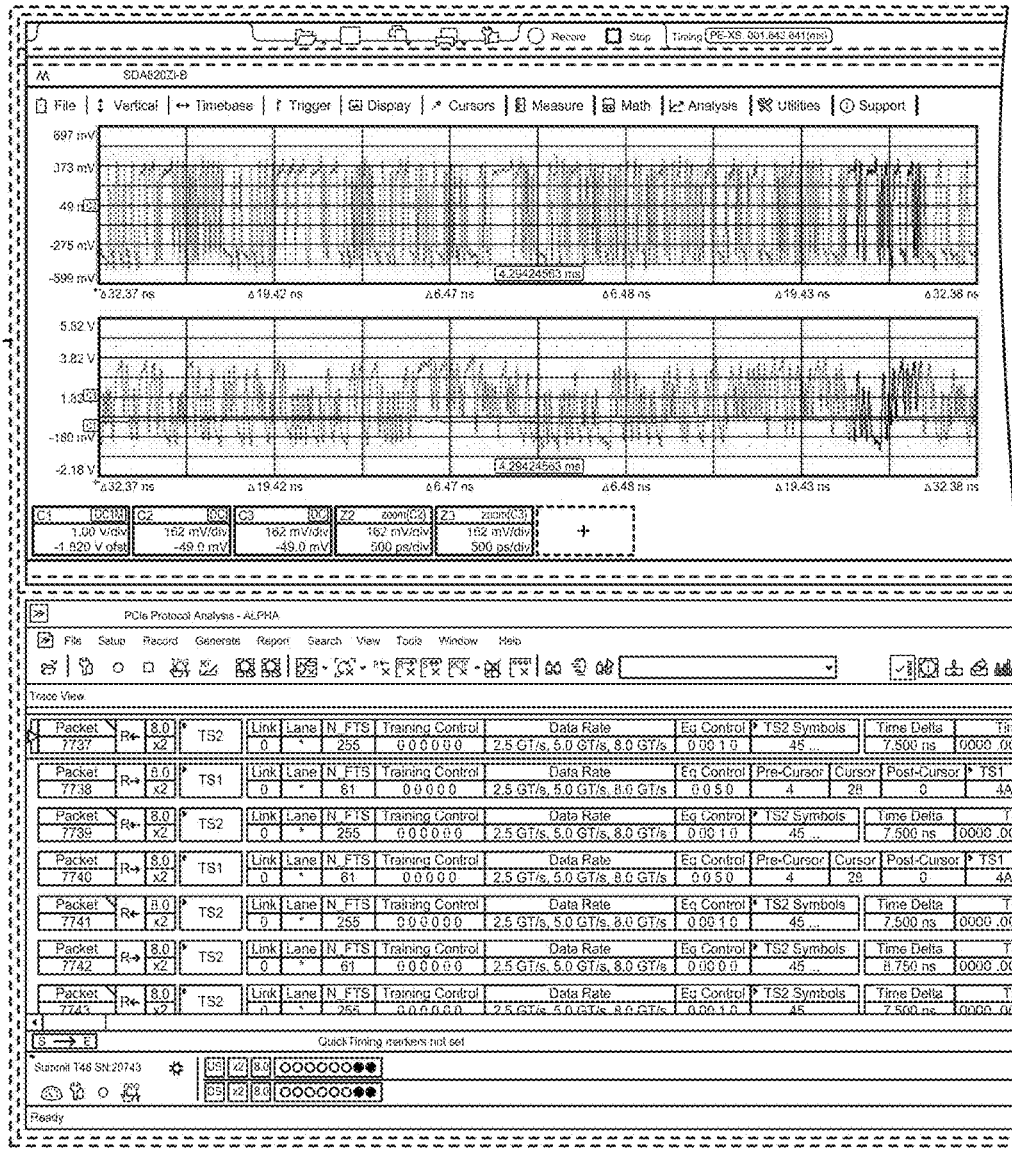
FIG. 21A shows a partial view of the CrossSync application with the oscilloscope application stacked on top of the protocol analyzer application, in accordance with at least one aspect of the present disclosure.
Figure 21B:
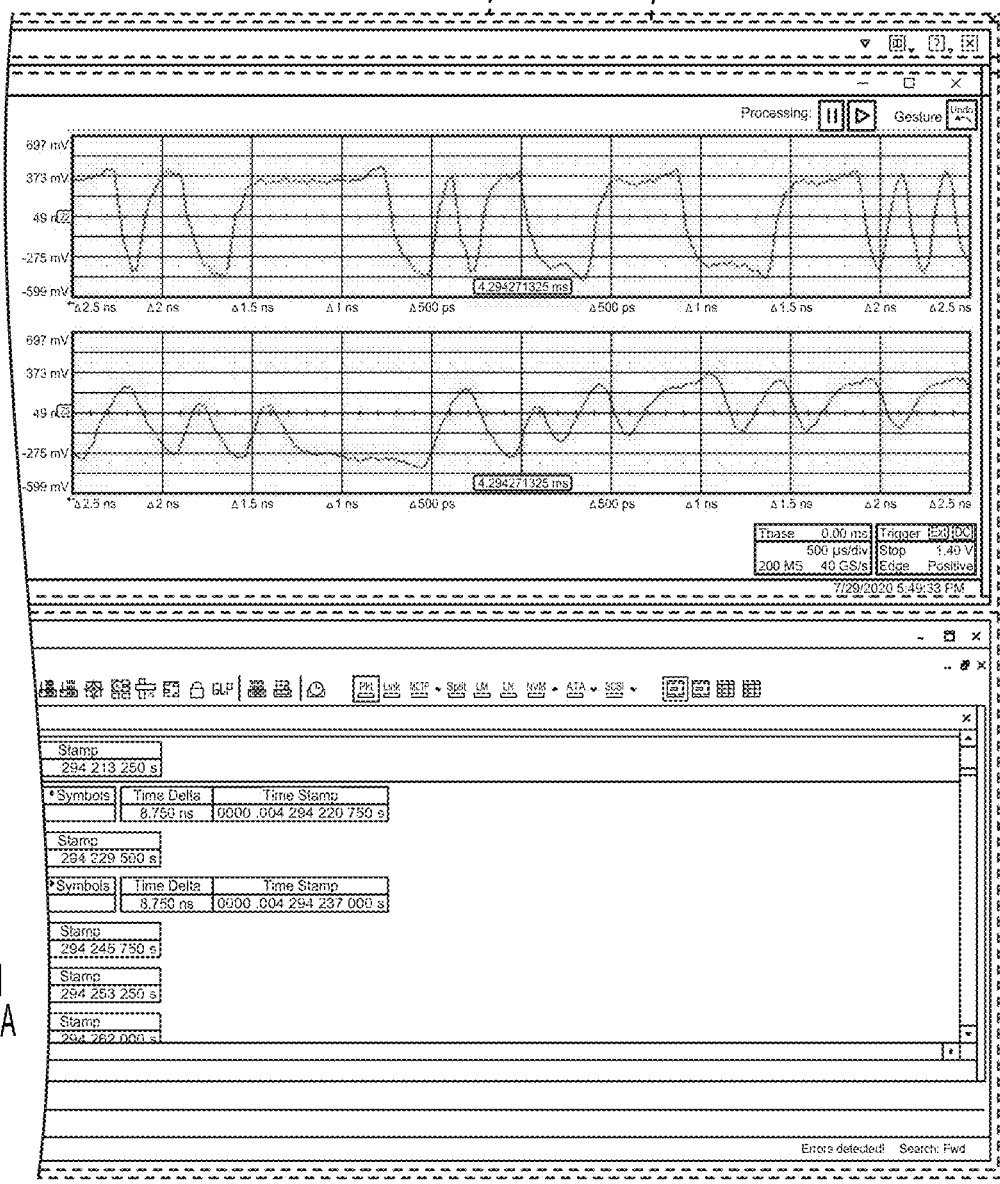
FIG. 21B shows a partial view of the CrossSync application with the oscilloscope application stacked on top of the protocol analyzer application, in accordance with at least one aspect of the present disclosure.

The horizontal [106] selection in FIG. 20 will stack the applications vertically and span them across primary display width as shown in FIGS. 21A-21B. This layout is convenient to visualize real-time data in the oscilloscope view. The vertical [108] selection in FIG. 20 will stack applications horizontally and span them across the primary display height minus the navigation bar as in FIGS. 18A-18B. This layout is convenient to visualize protocol packets in the protocol analyzer.

A user-defined layout is also supported by selecting custom layout [109]. The applications/views size and position can be modified manually using a mouse input device. The layout can be saved with the save current layout [111] selection in FIG. 20. The layout can be recalled at any time with custom layout [109] control. The multi-monitor [110] selection applies to the automatic horizontal and vertical layout of all connected monitors.

Figure 22:
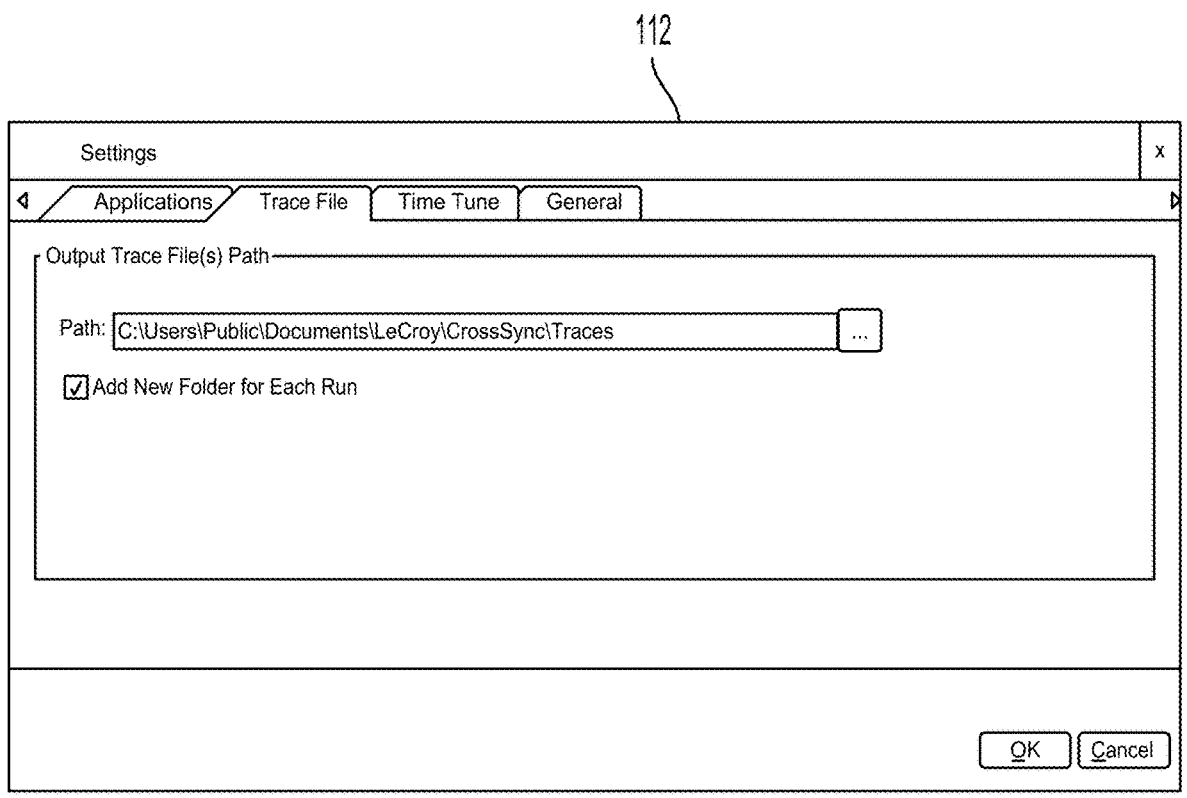
FIG. 22 shows the trace file settings dialog, in accordance with at least one aspect of the present disclosure.

After a successful capture of the data, the user can save a configuration file containing the application setups and data on disk. The location on the disk can be set in the trace file settings dialog [112] shown in FIG. 22 which can be configured by clicking the toolbox [87] selection in FIG. 16.

The available capture files on the disk can be reloaded at any time using the 30 open file [83] selection. When a preexisting waveform captured file is loaded with a configuration file, the applications associated with the data contents will automatically be launched by the CrossSync application. The time synchronization between multiple instruments is reloaded the same way as the waveforms were originally captured. The user is able to navigate and process the data upon loading the preexisting waveform.

Regarding cross-analysis, the digital oscilloscope typically captures data without the need for a direct or indirect clock signal associated with a signal. The protocol analyzers typically require the clock signal associated with a data signal. Due to this nature, the oscilloscope can acquire, process, and analyze the data without any constraints compared to the protocol analyzer. The protocol analyzer will not be able to capture and analyze the data when the clock signal is missing. This problem can be solved by capturing data in the oscilloscope, processing, and formatting the data in a compatible format and transferring it to the protocol analyzer. The protocol analyzer can use this information to analyze it along with its own captured data.

Typically, the digital communication protocol like PCI-Express requires the use of sideband signals for various control and status information. These signals are independent of high-frequency transmission and receiver signals. The present disclosure allows for the measurement of and analysis of the timing of various events between data captured by the multiple instruments.

Regarding markers and cursors, the user can add markers in the oscilloscope application based on visual inspection of the data. This marker information can be directly viewed in the protocol analyzer and can be used in various protocol analysis. Similarly, the user can add markers in the protocol analyzer based on visual inspection of the data. This marker information can be directly viewed in the oscilloscope display and can be used in various protocol analysis.

Some examples of the usefulness of simultaneous physical layer and protocol analysis include the analysis of dynamic system behaviors, such as PCI-Express power-on, or return to normal operation from a low-power state.

Power-on of a PCI-Express interface follows a relatively complex set of steps as the interface powers up and then traverses its Link Training Status State Machine (referred to in the PCI-Express® Base Specification Revision 5.0 Version 1.0) to reach the "Link Active" (L0) state at the desired link data rate.

The sequence of events starts with the de-assertion of the "PE Reset" signal, which would be visible to both protocol analyzer and oscilloscope. After that, the reference clock becomes active, an activity that the protocol analyzer is blind to, but the oscilloscope has full visibility of. The same is true of the next activity, when the high-speed transmitter emits a receiver detection pulse. After this, the link enters a polling state, which is visible to both instruments, but is sustained for a long period of time beyond what the oscilloscope is capable of acquiring.

The following state is a dynamic link configuration state. The first part of this state may be invisible to the protocol analyzer since it takes this instrument time to lock to the data stream. Later behavior may occur outside the oscilloscope's capture window, but be visible to the protocol analyzer. Acquiring with both instruments in a time-correlated way allows for deeper analysis of the link behavior than either instrument in isolation.

Once configured, the link becomes active (L0 state) at 2.5 GT/s. An active link spreads its data across more lanes than can be acquired by a typical oscilloscope, leaving full L0 visibility only possible with a protocol analyzer. In addition, most activity in this state is happening at a higher data abstraction level than the oscilloscope can interpret.

Moving the link to a higher rate is done through a process known as Recovery. The request to enter recovery is a high-level protocol event that cannot be seen or triggered on by the oscilloscope—but much of the following behavior is only visible to the oscilloscope.

During recovery, requests to modify equalization (transmitter electrical behavior) are visible only to the protocol analyzer, as the oscilloscope cannot trigger on this operation. But the results of equalization training are visible only to the oscilloscope, as the protocol analyzer cannot see the electrical characteristics of the signal. Only with a combination of oscilloscope and protocol analyzer that is capable of cross-triggering and time-correlated cross-analysis is it possible to fully characterize this entire sequence of events. For instance, the time delay between the reference clock startup and the receiver detect pulse (both visible only to the oscilloscope) and the initial transition to L0 at 2.5 GT/s (visible only to the protocol analyzer), can be easily measured with this system. Alternatively, a user wishing to characterize the Recovery state operation could use the protocol analyzer to trigger the oscilloscope on an equalization change request, and the oscilloscope could then capture the result. Another example is a PCI-Express system that is in a low-power (L1.2) state returning to a link active (L0) state. The sequence of events begins with clock Request assertion, which is visible to both protocol analyzer and oscilloscope. The following reference clock startup is visible only to the oscilloscope. As the link returns to Link Active (L0) at the previously-negotiated data rate, early link behavior is visible only to oscilloscope as protocol analyzer takes time to lock to bit stream. Later link behavior is visible only to protocol analyzer due to greater detail and longer capture time, and vents are striped across multiple lanes. In this instance, the oscilloscope's visibility into reference clock startup relative to the protocol analyzer's higher-level view would be invaluable. The ability to acquire voltage and current waveforms on the oscilloscope during this operation also enables real-time power consumption analysis fully time-correlated with protocol behavior.

In another aspect, the device has the ability to correlate power consumption of the DUT to an event happening on the communication between the host and the device under test. The power consumption is preferably measured by the oscilloscope and the communication events are captured by the protocol analyzer. The protocol analyzer captures and triggers the oscilloscope when an event occurs, in order to measure the instantaneous power measured by the oscilloscope. Alternatively, the oscilloscope captures instantaneous power and triggers the protocol analyzer to capture the state of the communication. The clock analog characteristics can be correlated to the protocol events. The measurements by the oscilloscope and by the protocol analyzer can be in the time domain or the frequency domain. Alternatively, the protocol analyzer creates a plurality of triggers on predefined events and the oscilloscope acquires the analog signal around the event.

Figure 23:
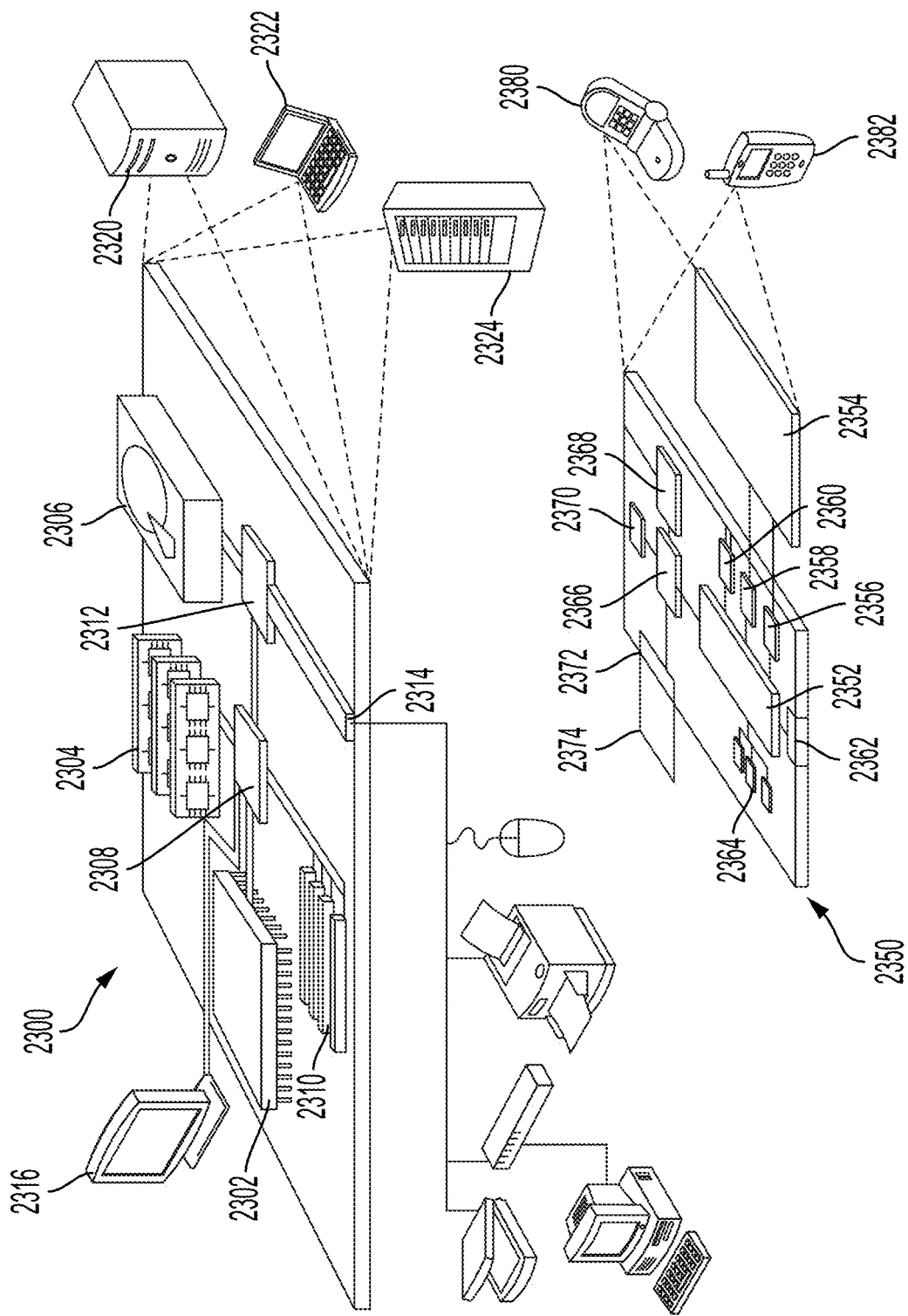
FIG. 23 is a block diagram of computing devices that may be used to implement the systems and methods describe in this document, as either a client or as a server or plurality of servers, in accordance with at least one aspect of the present disclosure.

FIG. 23 is a block diagram of computing devices [2300], [2350] that may be used to implement the systems and methods described in this document, as either a client or as a server or plurality of servers. Computing device [2300] is intended to represent various forms of digital computers, such as laptops, desktops, workstations, personal digital assistants, servers, blade servers, mainframes, and other appropriate computers. Computing device [2350] is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device [2300] includes a processor [2302], memory [2304], a storage device [2306], a high-speed controller [2308] connecting to memory [2304] and high-speed expansion ports [2310], and a low-speed controller [2312] connecting to low-speed expansion port [2314] and storage device [2306]. Each of the components [2302], [2304], [2306], [2308], [2310], and [2312], are interconnected using various busses, and may be mounted on a common motherboard or in other manners as appropriate. The processor [2302] can process instructions for execution within the computing device [2300], including instructions stored in the memory [2304] or on the storage device [2306] to display graphical information for a GUI on an external input/output device, such as display [2316] coupled to high-speed controller [2308]. In other implementations, multiple processors and/or multiple buses may be used, as appropriate, along with multiple memories and types of memory. Also, multiple computing devices [2300] may be connected, with each device providing portions of the necessary operations (e.g., as a server bank, a group of blade servers, or a multi-processor system).

The memory [2304] stores information within the computing device [2300]. In one implementation, the memory [2304] is a volatile memory unit or units. In another implementation, the memory [2304] is a non-volatile memory unit or units. The memory [2304] may also be another form of computer-readable medium, such as a magnetic or optical disk.

The storage device [2306] is capable of providing mass storage for computing device [2300]. In one implementation, the storage device [2306] may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory [2304], the storage device [2306], or memory on processor [2302].

The high-speed controller [2308] manages bandwidth-intensive operations for the computing device [2300], while the low-speed controller [2312] manages lower bandwidth-intensive operations. Such allocation of functions is an example only. In one implementation, the high-speed controller [2308] is coupled to memory [2304], display [2316] (e.g., through a graphics processor or accelerator), and to high-speed expansion ports [2310], which may accept various expansion cards (not shown). In the implementation, low-speed controller [2312] is coupled to storage device [2306] and low-speed expansion port [2314]. The low-speed expansion port [2314], which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device [2300] may be implemented in a number of different forms, as shown in the figure. For example, it may be implemented as a standard server [2320], or multiple times in a group of such servers. It may also be implemented as part of a rack server system [2324]. In addition, it may be implemented in a personal computer such as a laptop computer [2322]. Alternatively, components from computing device [2300] may be combined with other components in a mobile device (not shown), such as device [2350]. Each of such devices may contain one or more of computing device [2300], [2350], and an entire system may be made up of multiple computing devices [2300], [2350] communicating with each other.

The computing device [2350] includes a processor [2352], memory [2364], an input/output device such as a display [2354], a communication interface [2366], and a transceiver [2368], among other components. The device [2350] may also be provided with a storage device, such as a microdrive or other device, to provide additional storage. Each of the components [2350], [2352], [2364], [2354], [2366], and [2368], are interconnected using various buses, and several of the components may be mounted on a common motherboard or in other manners as appropriate.

The processor [2352] can execute instructions within the computing device [2350], including instructions stored in the memory [2364]. The processor may be implemented as a chipset of chips that include separate and multiple analog and digital processors. Additionally, the processor may be implemented using any of a number of architectures. For example, the processor may be a complex instruction set computer (CISC) processor, a reduced instruction set computer (RISC) processor, or a minimal instruction set computer (MISC) processor. The processor may provide, for example, for coordination of the other components of the device [2350], such as control of user interfaces, applications run by device [2350], and wireless communication by device [2350].

The processor [2352] may communicate with a user through control interface [2358] and display interface [2356] coupled to a display [2354]. The display [2354] may be, for example, a thin-film transistor (TFT) liquid crystal display or an organic light emitting diode (OLED) display, or other appropriate display technology. The display interface [2356] may comprise appropriate circuitry for driving the display [2354] to present graphical and other information to a user. The control interface [2358] may receive commands from a user and convert them for submission to the processor [2352]. In addition, an external interface [2362] may be provide in communication with processor [2352], so as to enable near area communication of device [2350] with other devices. External interface [2362] may be provided, for example, for wired communication in some implementations, or for wireless communication in other implementations, and multiple interfaces may also be used.

The memory [2364] stores information within the computing device [2350]. The memory [2364] can be implemented as one or more of a computer-readable medium or media, a volatile memory unit or units, or a non-volatile memory unit or units. Expansion memory [2374] may also be provided and connected to device [2350] through expansion interface [2372], which may include, for example, a single in-line memory module (SIMM) card interface. Such expansion memory [2374] may provide extra storage space for device [2350], or may also store applications or other information for device [2350]. Specifically, expansion memory [2374] may include instructions to carry out or supplement the processes described above, and may include secure information also. Thus, for example, expansion memory [2374] may be provide as a security module for device [2350], and may be programmed with instructions that permit secure use of device [2350]. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory [2364], expansion memory [2374], or memory on processor [2352] that may be received, for example, over transceiver [2368] or external interface [2362].

The device [2350] may communicate wirelessly through communication interface [2366], which may include digital signal processing circuitry where necessary. Communication interface [2366] may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver [2368]. In addition, short-range communication may occur, such as using a Bluetooth, WiFi, or other such transceiver (not shown). In addition, GPS (Global Positioning System) receiver module [2370] may provide additional navigation- and location-related wireless data to device [2350], which may be used as appropriate by applications running on device [2350].

The device [2350] may also communicate audibly using audio codec [2360], which may receive spoken information from a user and convert it to usable digital information. Audio codec [2360] may likewise generate audible sound for a user, such as through a speaker, e.g., in a handset of device [2350]. Such sound may include sound from voice telephone calls, may include recorded sound (e.g., voice messages, music files, etc.) and may also include sound generated by applications operating on device [2350].

The computing device [2350] may be implemented in a number of different forms, as shown in the figure. For example, it may be implemented as a cellular telephone [2380]. It may also be implemented as part of a smartphone [2382], personal digital assistant, or other similar mobile device.

Additionally, the computing device [2300] or [2350] can include USB flash drives. The USB flash drives may store operating systems and other applications. The USB flash drives can include input/output components, such as a wireless transmitter or USB connector that may be inserted into a USB port of another computing device.

Figure 24:
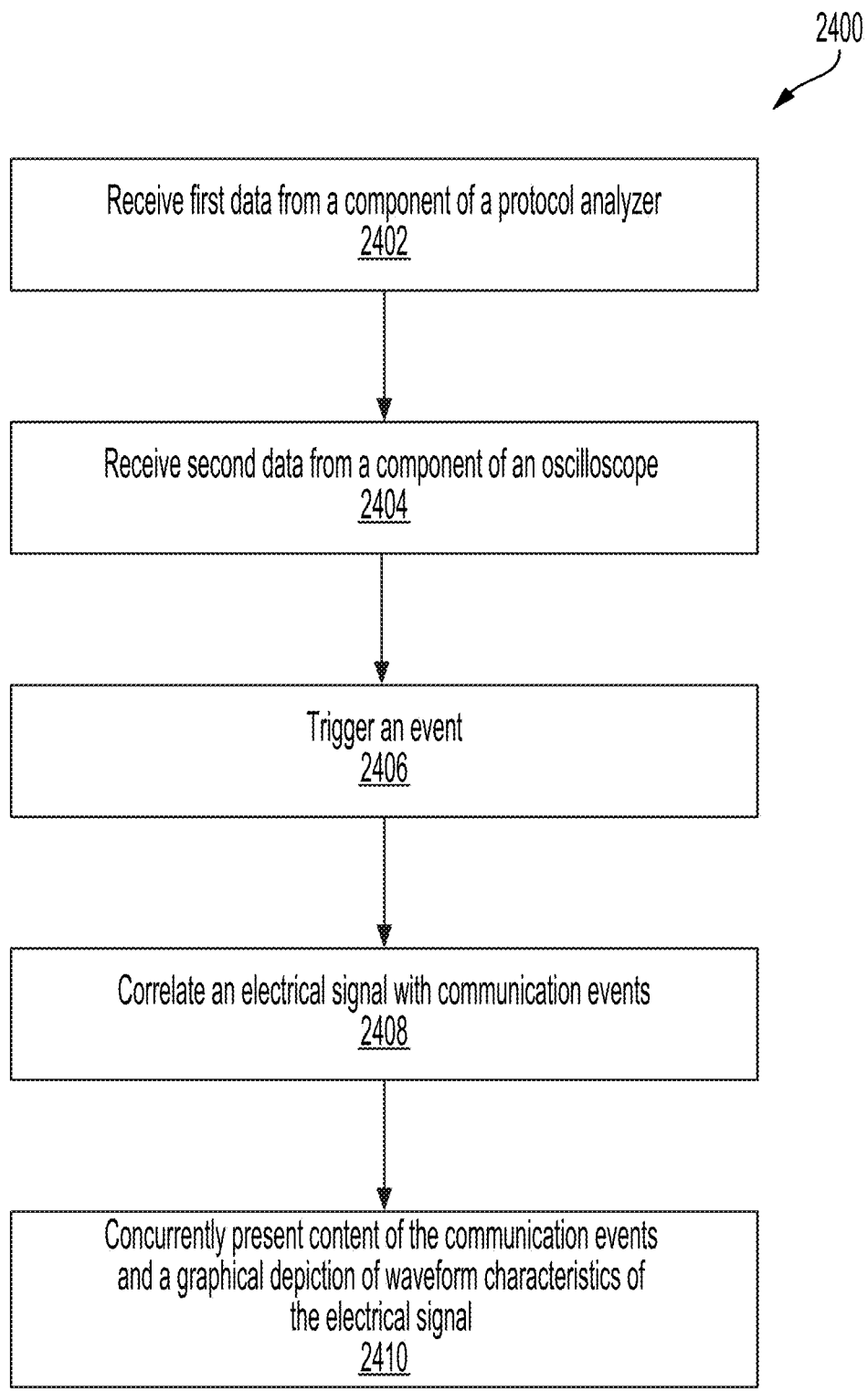
FIG. 24 is a logic flow diagram of a computer-implemented method, in accordance with at least one aspect of the present disclosure.

FIG. 24 is a logic flow diagram of a computer-implemented method [2400], in accordance with at least one aspect of the present disclosure. In one aspect of the computer-implemented method [2400], a circuit receives [2402] first data from a component of a protocol analyzer, wherein the first data specifies content of packets encoded in an electrical signal sent over a communication channel between a first device and a second device and analyzed by the protocol analyzer. The circuit receives [2404] second data from a component of an oscilloscope, wherein the second data specifies waveform characteristics of the electrical signal sent over the communication channel between the first device and the second device and probed by the oscilloscope. A component of the protocol analyzer triggers [2406] an event. The event causes the oscilloscope to capture additional electrical signals around time of the event or component of the oscilloscope triggers the protocol analyzer to capture communication events. The circuit correlates [2408] the electrical signal measurement with the communication events. A display device presents [2410] a user interface configured to concurrently present the content of the communication events specified by the first data received from the protocol analyzer, and a graphical depiction of the waveform characteristics of the electrical signal specified by the second data received from the component of the oscilloscope.

In one aspect, in accordance with the computer-implemented method [2400], the display device presents on the user interface the graphical depiction of the waveform characteristics of the electrical signal in time domain, the content of the packets specified by the first data received from the protocol analyzer in protocol domain, and a summary waveform characteristics of the electrical signal captured by the oscilloscope and the protocol analyzer on a common time scale.

In another aspect, in accordance with another aspect of the computer-implemented method [2400], the display device displays on the user interface a summary view. The summary view displays information comprising trigger points, capture time, errors, markers, or user selectable information, or any combination thereof.

In yet another aspect of the computer-implemented method [2400], the display device time-synchronizes a first point of a view in time of the waveform characteristics of the electrical signal with a first point of a view in time of the protocol analyzer data. Changing the first point of the view of the waveform characteristics of the electrical signal view changes the first point of the view of the protocol analyzer data and changing the first point of the view of the protocol analyzer data changes the first point of the view of the waveform characteristics of the electrical signal.

In still another aspect of the computer-implemented method [2400], the display device navigates the summary view to a plurality of display views by a control device comprising a mouse, keyboard, touch screen, front panel control, other user interface control devices, or any combination thereof.

In yet another aspect of the computer-implemented method [2400], the display device selects an individual item in the protocol display to open a zoom view in the oscilloscope display of an instrument. The time placement and duration of the zoom view relates to the time placement and duration of the individual item selected in the protocol analyzer display.

Figure 25:
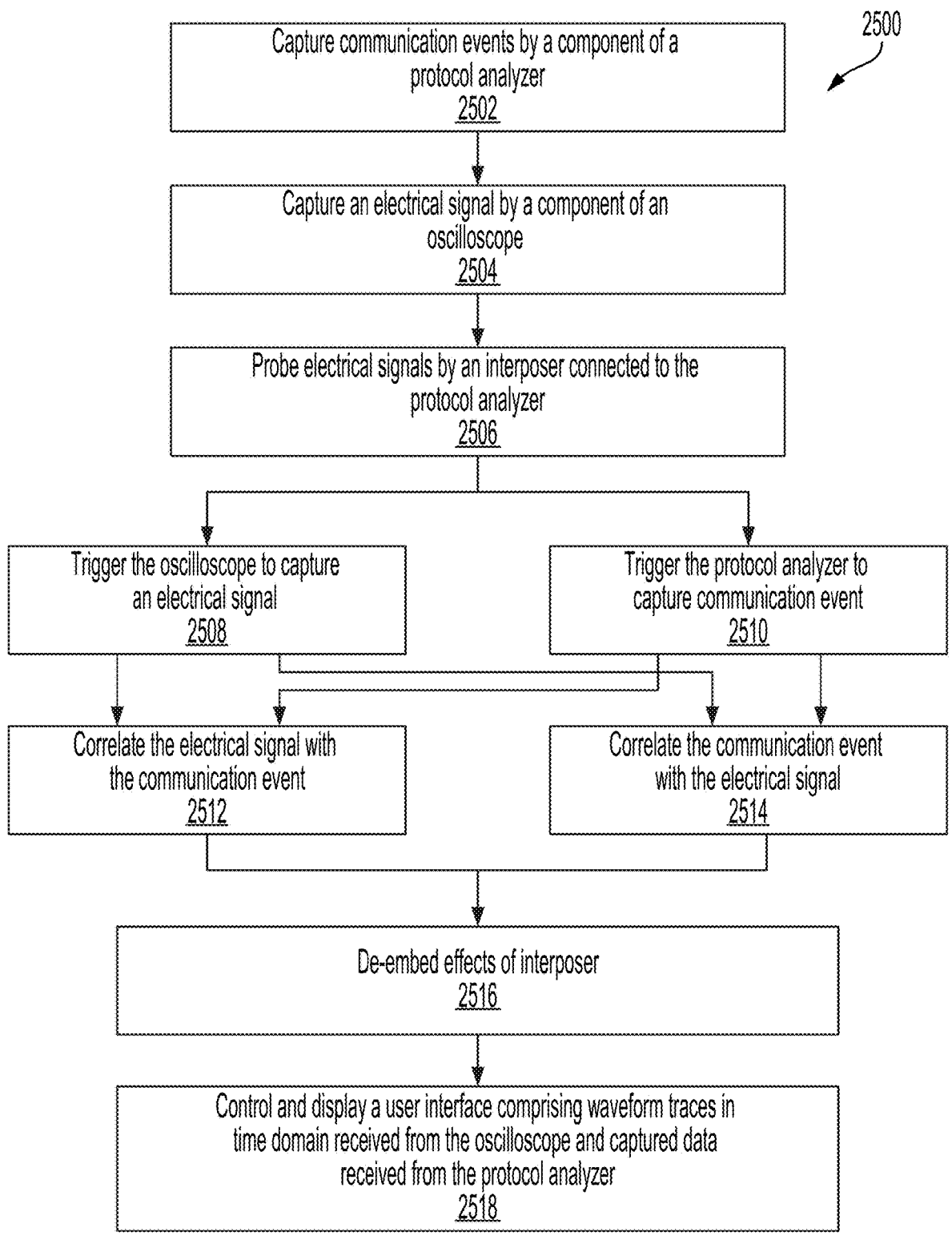
FIG. 25 is a logic flow diagram of a method for measuring a device, in accordance with at least one aspect of the present disclosure.

FIG. 25 is a logic flow diagram of a method [2500] for measuring a device, in accordance with at least one aspect of the present disclosure. In one aspect of the method [2500], a component of a protocol analyzer captures [2502] a communication event. A component of an oscilloscope captures [2504] an electrical signal. An interposer connected to the protocol analyzer, probes [2506] electrical signals. The interposer comprises one or many permanent probe tips or a connection for temporary attachment of probe tips. The probe tips are configured to probe analog characteristics of high speed signals and are electrically connected to the oscilloscope. The component of the protocol analyzer triggers [2508] the oscilloscope to capture an electrical signal or the component of the oscilloscope triggers [2510] the protocol analyzer to capture the communication event. A circuit correlates [2512] the electrical signal with the communication event or correlates [2514] the communication event to the electrical signal. The circuit de-embeds [2516] effects of the interposer received from the communication events and the electrical signal. The circuit controls and displays [2518] a user interface comprising waveform traces in time domain received from the oscilloscope and captured data received from the protocol analyzer. The user interface further comprises a summary of the waveform traces and the captured data on a common time scale.

In another aspect of the method [2500], the interposer probes an analog sideband signal through an electrostatic discharge protected wideband buffer coupled to the interposer. In another aspect, the interposer probes voltage and current and buffers the analog sideband signal to the component of the oscilloscope. In one aspect, the analog sideband signal is power consumption and in one aspect, the power consumption is correlated to an event.

In yet another aspect of the method [2500], the interposer probes a clock signal through an electrostatic discharge protected wideband buffer coupled to the interposer to avoid interference to the clock signal. In another aspect of the method [2500], the interposer probes the clock signal where the clock signal is received by the interposer to preserve original analog characteristics for the component of the oscilloscope. In yet another aspect of the method [2500], two single ended buffers capture two independent signals for the component of the oscilloscope and analyze differential and common mode characteristics of the clock signal.

In still another aspect of the method [2500], the component of the protocol analyzer captures an event and triggers the component of the oscilloscope to measure the instantaneous power of a device. In yet another aspect of the method [2500], the component of the oscilloscope capture instantaneous power and trigger the protocol analyzer to capture a state of communication.

In yet another aspect of the method [2500], the clock analog characteristics are correlated to a communication event.

In still another aspect of the method [2500], the electrical signal can be in a frequency domain or a time domain.

In yet another aspect of the method [2500], the component of the protocol analyzer creates a plurality of triggers for predefined events and triggers the component of the oscilloscope to acquire the electrical signal around the predefined event or multiple events.

In still another of the method [2500], the component of the oscilloscope creates a plurality of triggers for predefined events and triggers the protocol analyzer to acquire a communication event or multiple events.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms 'machine-readable medium" "computer-readable medium" refers to any computer program product, apparatus and/or device (e.g., magnetic discs, optical disks, memory, programmable logic devices (PLDs)) used to provide machine instructions and/or data to a programmable processor, including a machine-readable medium that receives machine instructions as a machine-readable signal. The term 'machine-readable signal' refers to any signal used to provide machine instructions and/or data to a programmable processor.

To provide for interaction with a user, the systems and techniques described here can be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input (e.g. a mouse, keyboard, touch screen, front panel control, other user interface control devices, or any combination thereof).

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Various aspects of the subject matter described herein are set out in the following numbered clauses. An aspect of the method or apparatus may include any one or more than one, and any combination of, the clauses described below.

Clause 1. A computer-implemented method, comprising: receiving, by a circuit, first data from a component of a protocol analyzer, wherein the first data specifies content of packets encoded in an electrical signal sent over a communication channel between a first device and a second device and analyzed by the protocol analyzer; receiving, by the circuit, second data from a component of one or more than one oscilloscope, wherein the second data specifies waveform characteristics of the electrical signal sent over the communication channel between the first device and the second device and probed by the one or more than one oscilloscope; triggering, by a component of the protocol analyzer, an event, wherein the event causes the one or more than one oscilloscope to capture additional electrical signals around time of the event or triggering; or triggering, by a component of the one or more than one oscilloscope, an event, wherein the event causes the protocol analyzer to capture communication events around time of the event or triggering; and presenting, by a display device, a user interface configured to concurrently present the content of the communication events specified by the first data received from the protocol analyzer, and a graphical depiction of the waveform characteristics of the electrical signal specified by the second data received from the component of the one or more than one oscilloscope.

Clause 2. The computer-implemented method of Clause 1, comprising: presenting, by the display device, on the user interface the graphical depiction of the waveform characteristics of the electrical signal in time domain; presenting, by the display device, on the user interface the content of the packets specified by the first data received from the protocol analyzer in protocol domain; and presenting, by the display device, on the user interface a summary of the waveform characteristics of the electrical signal captured by the one or more than one oscilloscope and the protocol analyzer on a common time scale.

Clause 3. The computer-implemented method of any one of Clauses 1-2, comprising: displaying, by the display device, on the user interface a summary view, wherein the summary view displays information comprising trigger points, capture time, errors, markers, or user selectable information, or any combination thereof.

Clause 4. The computer-implemented method of any one of Clause 1-3, comprising: time-synchronizing, by the display device, a first point of a view in time of the waveform characteristics of the electrical signal with a first point of a view in time of the protocol analyzer data, wherein changing the first point of the view of the waveform characteristics of the electrical signal changes the first point of the view of the protocol analyzer data and wherein changing the first point of the view of the protocol analyzer data changes the first point of the view of the waveform characteristics of the electrical signal.

Clause 5. The computer-implemented method of any one of Clauses 1-4, comprising: navigating, by the display device, the summary view to a plurality of display views by a control device comprising a mouse, keyboard, touch screen, front panel control, other user interface control devices, or any combination thereof.

Clauses 6. The computer-implemented method of any one of Clauses 1-5, comprising: selecting, by the display device, an individual item in the protocol display to open a zoom view in the one or more than one oscilloscope display of an instrument, wherein the time placement and duration of the zoom view relates to the time placement and duration of the individual item selected in the protocol analyzer display.

Clause 7. An apparatus, comprising: a circuit configured to: receive, by a circuit, first data from a component of a protocol analyzer, wherein the first data specifies content of packets encoded in an electrical signal sent over a communication channel between a first device and a second device and analyzed by the protocol analyzer; receive, by the circuit, second data from a component of one or more than one oscilloscope, wherein the second data specifies waveform characteristics of the electrical signal sent over the communication channel between the first device and the second device and probed by the one or more than one oscilloscope; trigger, by a component of the protocol analyzer, an event, wherein the event causes the one or more than one oscilloscope to capture additional electrical signals or trigger; or trigger, by a component of the one or more than one oscilloscope, an event, wherein the event causes the protocol analyzer to capture communication events around time of the event or trigger; correlate, by the circuit, the electrical signal measurement with the communication event; and present, on a display device, a user interface configured to concurrently present the content of the communication events specified by the first data received from the protocol analyzer, and a graphical depiction of the waveform characteristics of the electrical signal specified by the second data received from the component of the one or more than one oscilloscope.

Clause 8. The apparatus of Clause 7, wherein the circuit is configured to: present, on the display device, on the user interface the graphical depiction of the waveform characteristics of the electrical signal in time domain; present, on the display device, on the user interface the content of the packets specified by the first data received from the protocol analyzer in protocol domain; and present, on the display device, on the user interface a summary of the waveform characteristics of the electrical signal captured by the one or more than one oscilloscope and the protocol analyzer on a common time scale.

Clause 9. The apparatus of Clause 8, wherein the circuit is configured to display, on the display device, on the user interface a summary view, wherein the summary view displays information comprising trigger points, capture time, errors, markers, or user selectable information, or any combination thereof.

Clause 10. The apparatus of any one of Clauses 8-9, wherein the circuit is configured to time-synchronize a first point of the waveform characteristics of the electrical signal with a first point of the data received from the protocol analyzer, wherein changing the first point of the waveform characteristics of the electrical signal changes the first point of the data received from the protocol analyzer and wherein changing the first point of the data received from the protocol analyzer changes the first point of the waveform characteristics of the electrical signal.

Clause 11. The apparatus of any one of Clauses 8-10, wherein the circuit is configured to navigate, by the display device, the summary view to a plurality of display views by a control device comprising a mouse, keyboard, or touch screen, front panel control, other user interface control devices, or any combination thereof.

Clause 12. The apparatus of any one of Clauses 8-11, wherein the circuit is configured to select, by the display device, an individual item in protocol display to open a zoom view in the one or more than one oscilloscope display of an instrument, wherein the time placement and duration of the zoom view relates to the time placement and duration of the individual item selected in the protocol analyzer display.

Clause 13. A system for measuring a device comprising: a component of a protocol analyzer configured to capture a communication event; a component of one or more than one oscilloscope configured to capture an electrical signal, wherein the component of the one or more than one oscilloscope is further configured to trigger the component of the protocol analyzer to capture the communication event and wherein the component of the protocol analyzer is further configured to trigger the component of the one or more than one oscilloscope to capture the electrical signal; an interposer, connected to the protocol analyzer, wherein the interposer is configured to probe electrical signals and wherein the interposer comprises one or more than one permanent probe tip or connection for temporary attachment of probe tips, wherein the probe tips are configured to probe analog characteristics of high speed signals and are electrically connected to the one or more than one oscilloscope; and a circuit configured to: receive the communication event and the electrical signal; de-embed effects of the interposer from the communication event and the electrical signal; correlate the electrical signal to the communication event or correlate the communication event to the electrical signal; and control and display a user interface comprising waveform traces in time domain received from the one or more than one oscilloscope and captured data received from the protocol analyzer, wherein the user interface further comprises a summary of the waveform traces and the captured data on a common time scale.

Clause 14. The system of Clause 13, wherein the component of the one or more than one oscilloscope comprises a digital signal processor to correct a frequency response of the probe.

Clause 15. The system of any one of Clauses 13-14, comprising an electrostatic discharge protected wideband buffer coupled to the interposer, wherein the interposer is configured to probe an analog sideband signal through the electrostatic discharge protected wideband buffer.

Clause 16. The system of any one of Clauses 13-15, wherein the interposer is configured to probe voltage and current signals and to buffer the voltage and current signals to the component of the one or more than one oscilloscope, wherein the voltage or current signals are related to power consumption and wherein the power consumption is correlated to an event.

Clause 17. The system of any one of Clauses 13-16, comprising an electrostatic discharge protected wideband buffer coupled to the interposer, wherein the interposer is configured to probe a clock signal through the electrostatic discharge protected wideband buffer to avoid interference to the clock signal.

Clause 18. The system of Clause 17, wherein the clock signal is received by the interposer and the interposer is configured to probe the clock signal to preserve an original analog characteristic for the component of the one or more than one oscilloscope.

Clause 19. The system of any one of Clauses 17-18, comprising two single ended buffers configured to: capture two independent signals for the component of the one or more than one oscilloscope; and analyze differential and common mode characteristics of the clock signal.

Clause 20. The system of any one of Clauses 13-19, wherein the protocol analyzer is configured to: capture an event; and trigger the one or more than one oscilloscope to measure an electrical signal of a device.

Clause 21. The system of any one of Clauses 13-20, wherein the one or more than one oscilloscope is configured to: capture an electrical signal; and trigger the protocol analyzer to capture a state of communication.

Clause 22. The system of any one of Clauses 13-21, wherein an analog characteristic of the clock signal is correlated to a communication event.

Clause 23. The system of any one of Clauses 13-22, wherein the electrical signal is in a frequency domain or in a time domain.

Clause 24. The system of any one of Clauses 13-23, wherein the protocol analyzer is configured to: create a plurality of triggers for a predefined event or multiple events; and trigger the one or more than one oscilloscope to acquire an electrical signal around the predefined event or multiple events.

Clause 25. The system of any one of Clauses 13-24, wherein the one or more than one oscilloscope is configured to: create a plurality of triggers for a predefined event or multiple events; and trigger the protocol analyzer to acquire communication events around the predefined event or multiple events.

Clause 26. A method for measuring a device comprising: capturing a communication event by a component of a protocol analyzer; capturing an electrical signal by a component of one or more than one oscilloscope; probing, by an interposer connected to the protocol analyzer, electrical signals, wherein the interposer comprises one or many permanent probe tips or a connection for temporary attachment of probe tips, wherein the probe tips are configured to probe analog characteristics of high speed signals and are electrically connected to the one or more than one oscilloscope; triggering, by a component of the protocol analyzer, the one or more than one oscilloscope to capture an electrical signal or triggering; or triggering, by a component of the one or more than one oscilloscope, an event, wherein the event causes the protocol analyzer to capture communication events around time of the event or triggering; correlating, by a circuit, the electrical signal with the communication event or correlating, by the circuit, the communication event to the electrical signal; de-embedding, by the circuit, effects of the interposer from the communication event and the electrical signal; and controlling and displaying, by the circuit, a user interface comprising waveform traces in time domain from the one or more than one oscilloscope and captured data from the protocol analyzer, wherein the user interface further comprises a summary of the waveform traces and the captured data on a common time scale.

Clause 27. The method of Clause 26, comprising correcting a frequency response of the probe by a digital signal processor.

Clause 28. The method of any one of Clauses 26-27, comprising probing, by the interposer, an analog sideband signal through an electrostatic discharge protected wideband buffer coupled to the interposer.

Clause 29. The method of any one of Clauses 26-28, comprising probing, by the interposer, voltage and current signals and buffering the voltage and current signals to the component of the one or more than one oscilloscope, wherein the voltage and current signals are related to power consumption and wherein the power consumption is correlated to an event.

Clause 30. The method of any one of Clauses 26-29, comprising probing, by the interposer, a clock signal through an electrostatic discharge protected wideband buffer coupled to the interposer to avoid interference to the clock signal.

Clause 31. The method of Clause 30, comprising probing, by the interposer, the clock signal where the clock signal is received by the interposer to preserve original analog characteristics for the component of the one or more than one oscilloscope.

Clause 32. The method of Clause 30, comprising capturing, by two single ended buffers, two independent signals for the component of the one or more than one oscilloscope and to analyze differential and common mode characteristics of the clock signal.

Clause 33. The method of any one of Clauses 26-32, comprising capturing an event and triggering, by the component of the protocol analyzer, the component of the one or more than one oscilloscope to measure an electrical signal of a device.

Clause 34. The method of any one of Clauses 26-33, comprising capturing, by the circuit, an electrical signal from the components of the one or more than one oscilloscope and triggering, by the component of the one or more than one oscilloscope, the protocol analyzer to capture a state of communication.

Clause 35. The method of any one of Clauses 26-34, comprising correlating, by the circuit, clock analog characteristics to a communication event.

Clause 36. The method of any one of Clauses 26-35, wherein the analog signal is in a frequency domain or a time domain.

Clause 37. The method of any one of Clauses 26-36, comprising creating, a plurality of triggers from the component of the protocol analyzer for a predefined event or multiple events; and triggering, the component of the one or more than one oscilloscope, to acquire the analog signal around the predefined event or multiple events.

Clause 38. The method of any one of Clauses 26-37, comprising creating, a plurality of triggers by the component of the one or more than one oscilloscope for a predefined event or multiple events; and triggering the protocol analyzer to acquire communication around the predefined event or multiple events.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present disclosure has been described with reference to various exemplary and illustrative aspects. The aspects described herein are understood as providing illustrative features of varying detail of various aspects of the present disclosure; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the present disclosure. Accordingly, it will be recognized by persons having ordinary skill in the art that various substitutions, modifications or combinations of any of the exemplary aspects may be made without departing from the scope of the present disclosure. In addition, persons skilled in the art will recognize, or be able to ascertain using no more than routine experimentation, many equivalents to the various aspects of the present disclosure upon review of this specification. Thus, the present disclosure is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all subranges subsumed within the recited range. For example, a range of "1 to 100" includes all sub-ranges between (and including) the recited minimum value of 1 and the recited maximum value of 100, that is, having a minimum value equal to or greater than 1 and a maximum value equal to or less than 100. Also, all ranges recited herein are inclusive of the end points of the recited ranges. For example, a range of "1 to 100" includes the end points 1 and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the term "circuit" may refer to, for example, hardwired circuitry, programmable circuitry (e.g., a computer processor including one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein "circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December, 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

The terms "proximal" and "distal" are used herein with reference to a clinician manipulating the handle portion of the surgical instrument. The term "proximal" refers to the portion closest to the clinician and the term "distal" refers to the portion located away from the clinician. It will be further appreciated that, for convenience and clarity, spatial terms such as "vertical", "horizontal", "up", and "down" may be used herein with respect to the drawings. However, surgical instruments are used in many orientations and positions, and these terms are not intended to be limiting and/or absolute.

It will thus be seen that the aspects set forth above, among those made apparent from the preceding description, are efficiently attained and, because certain changes may be made in carrying out the above method and in the construction(s) set forth without departing from the scope of the present disclosure, it is intended that all matter contained in the above description and shown in the accompanying drawings shall be interpreted as illustrative and not in a limiting sense.

It is also to be understood that the following claims are intended to cover all of the generic and specific features of the present disclosure and all statements of the scope of the present disclosure which, as a matter of language, might be said to fall therebetween.

What is claimed is:

1. A computer-implemented method, comprising:
    receiving, by a circuit, first data from a component of a protocol analyzer, wherein the first data specifies content of packets encoded in an electrical signal sent over a communication channel between a first device and a second device and analyzed by the protocol analyzer;
    receiving, by the circuit, second data from a component of one or more than one oscilloscope, wherein the second data specifies waveform characteristics of the electrical signal sent over the communication channel between the first device and the second device and probed by the one or more than one oscilloscope, wherein the protocol analyzer is separate from the one or more than one oscilloscope;
    triggering, by a component of the protocol analyzer, an event, wherein the event causes the one or more than one oscilloscope to capture additional electrical signals around time of the event or triggering; or
    triggering, by a component of the one or more than one oscilloscope, an event, wherein the event causes the protocol analyzer to capture communication events around time of the event or triggering;
    correlating, by the circuit, the electrical signal with the communication events; and
    presenting, by a display device, a user interface configured to concurrently present content of the communication events specified by the first data received from the protocol analyzer, and a graphical depiction of the waveform characteristics of the electrical signal specified by the second data received from the component of the one or more than one oscilloscope.

2. The computer-implemented method of claim 1, comprising:
    presenting, by the display device, on the user interface the graphical depiction of the waveform characteristics of the electrical signal in time domain;
    presenting, by the display device, on the user interface the content of the packets specified by the first data received from the protocol analyzer in protocol domain; and
    presenting, by the display device, on the user interface a summary view of the waveform characteristics of the electrical signal captured by the one or more than one oscilloscope and the protocol analyzer on a common time scale.

3. The computer-implemented method of claim 2, comprising:
    displaying, by the display device, on the user interface a summary view, wherein the summary view displays information comprising trigger points, capture time, errors, markers, or user selectable information, or any combination thereof.

4. The computer-implemented method of claim 2, comprising:
    time-synchronizing, by the display device, a first point of a view in time of the waveform characteristics of the electrical signal with a first point of a view in time of a protocol analyzer view, wherein changing the first point of the view of the waveform characteristics of the electrical signal changes the first point of the view of the protocol analyzer data and wherein changing the first point of the view of the protocol analyzer data changes the first point of the view of the waveform characteristics of the electrical signal.

5. The computer-implemented method of claim 2, comprising:
    navigating, by the display device, the summary view to a plurality of display views by a control device comprising a mouse, keyboard, touch screen, front panel control, other user interface control devices, or any combination thereof.

6. The computer-implemented method of claim 2, comprising:
    selecting, by the display device, an individual item in a protocol analyzer display to open a zoom view in the one or more than one oscilloscope display of an instrument, wherein a time placement and duration of the zoom view relates to the time placement and duration of the individual item selected in the protocol analyzer display.

7. An apparatus, comprising:
a circuit configured to:
receive, by a circuit, first data that from a component of a protocol analyzer, wherein the first data specifies content of packets encoded in an electrical signal sent over a communication channel between a first device and a second device and analyzed by the protocol analyzer;
receive, by the circuit, second data from a component of one or more than one oscilloscope, wherein the second data specifies waveform characteristics of the electrical signal sent over the communication channel between the first device and the second device and probed by the one or more than one oscilloscope, wherein the protocol analyzer is separate from the one or more than one oscilloscope;
trigger, by a component of the protocol analyzer, an event, wherein the event causes the oscilloscope to capture additional electrical signals or trigger; or
trigger, by a component of the one or more than one oscilloscope, an event, wherein the event causes the protocol analyzer to capture communication events around time of the event or trigger;
correlate, by the circuit, the electrical signal with the communication events; and
present, on a display device, a user interface configured to concurrently present the content of the communication events specified by the first data received from the protocol analyzer, and a graphical depiction of the waveform characteristics of the electrical signal specified by the second data received from the component of the one or more than one oscilloscope.

8. The apparatus of claim 7, wherein the circuit is configured to:
present, on the display device, on the user interface the graphical depiction of the waveform characteristics of the electrical signal in time domain;
present, on the display device, on the user interface the content of the packets specified by the first data received from the protocol analyzer in protocol domain; and
present, on the display device, on the user interface a summary view of the waveform characteristics of the electrical signal captured by the one or more than one oscilloscope and the protocol analyzer on a common time scale.

9. The apparatus of claim 8, wherein the circuit is configured to display, on the display device, on the user interface a summary view, wherein the summary view displays information comprising trigger points, capture time, errors, markers, or user selectable information, or any combination thereof.

10. The apparatus of claim 8, wherein the circuit is configured to time-synchronize a first point of the waveform characteristics of the electrical signal with a first point of the first data received from the protocol analyzer, wherein changing the first point of the waveform characteristics of the electrical signal changes the first point of the first data received from the protocol analyzer and wherein changing the first point of the first data received from the protocol analyzer changes the first point of the waveform characteristics of the electrical signal.

11. The apparatus of claim 8, wherein the circuit is configured to navigate, by the display device, the summary view to a plurality of display views by a control device comprising a mouse, keyboard, or touch screen, front panel control, other user interface control devices, or any combination thereof.

12. The apparatus of claim 8, wherein the circuit is configured to select, by the display device, an individual item in a protocol analyzer display to open a zoom view in the one or more than one oscilloscope display of an instrument, wherein a time placement and duration of the zoom view relates to the time placement and duration of the individual item selected in the protocol analyzer display.

13. A system for measuring a device comprising:
a component of a protocol analyzer configured to capture a communication event;
a component of one or more than one oscilloscope configured to capture an electrical signal, wherein the component of the one or more than one oscilloscope is further configured to trigger the component of the protocol analyzer to capture the communication event and wherein the component of the protocol analyzer is further configured to trigger the component of the one or more than one oscilloscope to capture the electrical signal, wherein the protocol analyzer is separate from the one or more than one oscilloscope;
an interposer, connected to the protocol analyzer, wherein the interposer is configured to probe electrical signals and wherein the interposer comprises one or more than one permanent probe tips or connection for temporary attachment of probe tips, wherein the probe tips are configured to probe analog characteristics of high speed signals and are electrically connected to the one or more than one oscilloscope; and
a circuit configured to:
receive the communication event and the electrical signal;
de-embed effects of the interposer from the communication event and the electrical signal;
correlate the electrical signal to the communication event or correlate the communication event to the electrical signal; and
control and display a user interface comprising waveform traces in time domain from the one or more than one oscilloscope and captured data from the protocol analyzer, wherein the user interface further comprises a summary of the waveform traces and the captured data on a common time scale.

14. The system of claim 13, wherein the component of the one or more than one oscilloscope comprises a digital signal processor to correct a frequency response of the probe tips.

15. The system of claim 13, comprising an electrostatic discharge protected wideband buffer coupled to the interposer, wherein the interposer is configured to probe an analog sideband signal through the electrostatic discharge protected wideband buffer.

16. The system of claim 13, wherein the interposer is configured to probe voltage and current signals and to buffer the voltage and current signals to the component of the one or more than one oscilloscope, wherein the voltage and current signals are related to power consumption and wherein the power consumption is correlated to an event.

17. The system of claim 13, comprising an electrostatic discharge protected wideband buffer coupled to the interposer, wherein the interposer is configured to probe a clock signal through the electrostatic discharge protected wideband buffer to avoid interference to the clock signal.

18. The system of claim 17, wherein the clock signal is received by the interposer and the interposer is configured to probe the clock signal to preserve an original analog characteristic for the component of the one or more than one oscilloscope.

19. The system of claim 17, comprising two single ended buffers configured to:
capture two independent signals for the component of the one or more than one oscilloscope; and
analyze differential and common mode characteristics of the clock signal.

20. The system of claim 13, wherein the protocol analyzer is configured to:
capture an event; and
trigger the one or more than one oscilloscope to measure an electrical signal of a device.

21. The system of claim 13, wherein the one or more than one oscilloscope is configured to:
capture an electrical signal; and
trigger the protocol analyzer to capture a state of communication.

22. The system of claim 13, wherein an analog characteristic of a clock signal is correlated to a communication event.

23. The system of claim 13, wherein the analog characteristics of high speed signal is in a frequency domain or in a time domain.

24. The system of claim 13, wherein the protocol analyzer is configured to:
create a plurality of triggers for a predefined event or multiple events; and
trigger the oscilloscope to acquire an analog signal around the predefined event or multiple events.

25. The system of claim 13, wherein the one or more than one oscilloscope is configured to:
create a plurality of triggers for a predefined event or multiple events; and
trigger the protocol analyzer to acquire communication events around the predefined event or multiple events.

26. A method for measuring a device comprising:
capturing a communication event by a component of a protocol analyzer;
capturing an electrical signal by a component of one or more than one oscilloscope, wherein the protocol analyzer is separate from the one or more than one oscilloscope;
probing, by an interposer connected to the protocol analyzer, electrical signals, wherein the interposer comprises one or many permanent probe tips or a connection for temporary attachment of probe tips, wherein the probe tips are configured to probe analog characteristics of high speed signals and are electrically connected to the one or more than one oscilloscope;
triggering, from a component of the protocol analyzer, the one or more than one oscilloscope to capture the electrical signal or triggering; or
triggering, by a component of the one or more than one oscilloscope, an event, wherein the event causes the protocol analyzer to capture communication events around time of the event or triggering;
correlating, by a circuit, the electrical signal with the communication event or correlating, by the circuit, the communication event to the electrical signal;
de-embedding, by the circuit, effects of the interposer from the communication event and the electrical signal; and
controlling and displaying, by the circuit, a user interface comprising waveform traces in time domain from the one or more than one oscilloscope and captured data from the protocol analyzer, wherein the user interface further comprises a summary of the waveform traces and the captured data on a common time scale.

27. The method of claim 26, comprising correcting a frequency response of the probe tips by a digital signal processor.

28. The method of claim 26, comprising probing, by the interposer, an analog sideband signal through an electrostatic discharge protected wideband buffer coupled to the interposer.

29. The method of claim 26, comprising probing, by the interposer, voltage and current signals and buffering the voltage and current signals to the component of the one or more than one oscilloscope, wherein the voltage and current signals are related to power consumption and wherein the power consumption is correlated to an event.

30. The method of claim 26, comprising, probing, by the interposer, a clock signal through an electrostatic discharge protected wideband buffer coupled to the interposer to avoid interference to the clock signal.

31. The method of claim 30, comprising, probing, by the interposer, the clock signal where the clock signal is received by the interposer to preserve original analog characteristics for the component of the one or more than one oscilloscope.

32. The method of claim 30, comprising, capturing, by two single ended buffers, two independent signals for the component of the one or more than one oscilloscope and to analyze differential and common mode characteristics of the clock signal.

33. The method of claim 26, comprising, capturing an event, and triggering, by the component of the protocol analyzer, the component of the one or more than one oscilloscope to measure an electrical signal of a device.

34. The method of claim 26, capturing, from the component of the one or more than one oscilloscope, an electrical signal and triggering, from the component of the one or more than one oscilloscope, the protocol analyzer to capture a state of communication.

35. The method of claim 26, correlating clock analog characteristics to a communication event.

36. The method of claim 26, wherein the analog characteristics of high speed signal can be in a frequency domain or a time domain.

37. The method of claim 26, creating, by the component of the protocol analyzer, a plurality of triggers for a predefined event or multiple events and triggering, the component of the one or more than one oscilloscope, to acquire an analog signal around the predefined event or multiple events.

38. The method of claim 26, creating, from the component of the one or more than one oscilloscope, a plurality of triggers for a predefined event or multiple events; and triggering the protocol analyzer to acquire a communication event or multiple events.

* * * * *